(12) United States Patent
Xu et al.

(10) Patent No.: US 12,335,915 B2
(45) Date of Patent: Jun. 17, 2025

(54) PAGING EARLY INDICATION FOR A USER EQUIPMENT

(71) Applicant: QUALCOMM Incorporated, San Diego, CA (US)

(72) Inventors: Huilin Xu, Temecula, CA (US); Jing Lei, San Diego, CA (US); Peter Pui Lok Ang, San Diego, CA (US); Carsten Aagaard Pedersen, Bolton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 17/937,154

(22) Filed: Sep. 30, 2022

(65) Prior Publication Data

US 2023/0133097 A1    May 4, 2023

Related U.S. Application Data

(60) Provisional application No. 63/263,558, filed on Nov. 4, 2021.

(51) Int. Cl.
*H04W 68/02* (2009.01)
*H04W 72/0453* (2023.01)

(52) U.S. Cl.
CPC ....... *H04W 68/02* (2013.01); *H04W 72/0453* (2013.01)

(58) Field of Classification Search
CPC ............. H04W 68/02; H04W 68/025; H04W 72/0453; H04W 52/0216; H04W 52/0219; H04W 52/0229; H04W 52/028
See application file for complete search history.

(56) References Cited

U.S. PATENT DOCUMENTS

| 2023/0023161 A1* | 1/2023 | Liu | H04W 68/025 |
| 2023/0049735 A1* | 2/2023 | Lin | H04L 5/0053 |
| 2023/0403679 A1* | 12/2023 | Zhou | H04W 72/232 |

(Continued)

FOREIGN PATENT DOCUMENTS

| EP | 3993514 A1 | 5/2022 |
| WO | WO-2020205652 A1 | 10/2020 |
| WO | WO-2021034174 A1 | 2/2021 |

OTHER PUBLICATIONS

International Search Report and Written Opinion—PCT/US2022/077478—ISA/EPO—Feb. 6, 2023.

(Continued)

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) included in a first category of UEs may receive a configuration that configures a paging early indication (PEI) in a first initial downlink bandwidth part associated with the first category of UEs, and may monitor for a PEI in the first initial downlink bandwidth part based at least in part on the configuration. In some aspects, the UE may receive a configuration that configures a PEI in a second initial downlink bandwidth part associated with a second category of UEs, and may monitor for a PEI in the second initial downlink bandwidth part based at least in part on the configuration. Numerous other aspects are described.

25 Claims, 11 Drawing Sheets

(56) References Cited

U.S. PATENT DOCUMENTS

| | | | |
|---|---|---|---|
| 2024/0049182 A1* | 2/2024 | Zhou | H04W 72/232 |
| 2024/0147421 A1* | 5/2024 | Hou | H04L 5/0051 |
| 2024/0155580 A1* | 5/2024 | Wang | H04L 5/0053 |
| 2024/0163730 A1* | 5/2024 | Li | H04W 28/20 |
| 2024/0196413 A1* | 6/2024 | Chatterjee | H04W 74/0833 |
| 2024/0322947 A1* | 9/2024 | Xiong | H04L 1/08 |

OTHER PUBLICATIONS

Moderator (Ericsson): "FL Summary #3 on Reduced Maximum UE Bandwidth for RedCap", 3GPP TSG-RAN WG1 Meeting #106bis-e, R1-2110379, 3GPP Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 15, 2021, 70 Pages, XP052061257, Proposal 2, p. 19 Vivo Contribution, p. 31 Lenovo Contribution, p. 32 Oppo Contribution, p. 48 CMCC contribution, p. 50.

* cited by examiner

PAGING EARLY INDICATION FOR A USER EQUIPMENT

CROSS-REFERENCE TO RELATED APPLICATION

This Patent Application claims priority to U.S. Provisional Patent Application No. 63/263,558, filed on Nov. 4, 2021, entitled "PAGING EARLY INDICATION FOR A REDUCED CAPABILITY USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for paging early indication (PEI) for a reduced capability (RedCap) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in L IL, NR, and other radio access technologies remain useful.

SUMMARY

Some aspects described herein relate to a method of wireless communication performed by a UE. The method may include receiving a configuration that configures a paging early indication (PEI) in a first initial downlink bandwidth part, the UE being included in a first category of UEs and the first initial downlink bandwidth part being an initial downlink bandwidth part associated with the first category of UEs. The method may include monitoring for a PEI in the first initial downlink bandwidth part based at least in part on the configuration.

Some aspects described herein relate to a method of wireless communication performed by a base station. The method may include transmitting a configuration that configures a PEI in a first initial downlink bandwidth part. The method may include transmitting a PEI for a UE in the first initial downlink bandwidth part based at least in part on the configuration, the UE being included in a first category of UEs and the first initial downlink bandwidth part being an initial downlink bandwidth part associated with the first category of UEs.

Some aspects described herein relate to a method of wireless communication performed by a UE. The method may include receiving a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs. The method may include monitoring for a PEI in the second initial downlink bandwidth part based at least in part on the configuration.

Some aspects described herein relate to a method of wireless communication performed by a base station. The method may include transmitting a configuration that configures a PEI in a second initial downlink bandwidth part. The method may include transmitting a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs.

Some aspects described herein relate to a UE for wireless communication. The UE may include a memory and one or more processors coupled to the memory. The one or more processors may be configured to receive a configuration that configures a PEI in a first initial downlink bandwidth part, the UE being included in a first category of UEs and the first initial downlink bandwidth part being an initial downlink bandwidth part associated with the first category of UEs. The one or more processors may be configured to monitor for a PEI in the first initial downlink bandwidth part based at least in part on the configuration.

Some aspects described herein relate to a base station for wireless communication. The base station may include a memory and one or more processors coupled to the memory. The one or more processors may be configured to transmit a configuration that configures a PEI in a first initial downlink bandwidth part. The one or more processors may be configured to transmit a PEI for a UE in the first initial downlink bandwidth part based at least in part on the configuration, the UE being included in a first category of UEs and the first initial downlink bandwidth part being an initial downlink bandwidth part associated with the first category of UEs.

Some aspects described herein relate to a UE for wireless communication. The UE may include a memory and one or more processors coupled to the memory. The one or more processors may be configured to receive a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs. The one or more processors may be configured to monitor for a PEI in the second initial downlink bandwidth part based at least in part on the configuration.

Some aspects described herein relate to a base station for wireless communication. The base station may include a memory and one or more processors coupled to the memory. The one or more processors may be configured to transmit a configuration that configures a PEI in a second initial downlink bandwidth part. The one or more processors may be configured to transmit a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs.

Some aspects described herein relate to a non-transitory computer-readable medium that stores a set of instructions for wireless communication by a UE. The set of instructions, when executed by one or more processors of the UE, may cause the UE to receive a configuration that configures a PEI in a first initial downlink bandwidth part, the UE being included in a first category of UEs and the first initial downlink bandwidth part being an initial downlink bandwidth part associated with the first category of UEs. The set of instructions, when executed by one or more processors of the UE, may cause the UE to monitor for a PEI in the first initial downlink bandwidth part based at least in part on the configuration.

Some aspects described herein relate to a non-transitory computer-readable medium that stores a set of instructions for wireless communication by a base station. The set of instructions, when executed by one or more processors of the base station, may cause the base station to transmit a configuration that configures a PEI in a first initial downlink bandwidth part. The set of instructions, when executed by one or more processors of the base station, may cause the base station to transmit a PEI for a UE in the first initial downlink bandwidth part based at least in part on the configuration, the UE being included in a first category of UEs and the first initial downlink bandwidth part being an initial downlink bandwidth part associated with the first category of UEs.

Some aspects described herein relate to a non-transitory computer-readable medium that stores a set of instructions for wireless communication by a UE. The set of instructions, when executed by one or more processors of the UE, may cause the UE to receive a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs. The set of instructions, when executed by one or more processors of the UE, may cause the UE to monitor for a PEI in the second initial downlink bandwidth part based at least in part on the configuration.

Some aspects described herein relate to a non-transitory computer-readable medium that stores a set of instructions for wireless communication by a base station. The set of instructions, when executed by one or more processors of the base station, may cause the base station to transmit a configuration that configures a PEI in a second initial downlink bandwidth part. The set of instructions, when executed by one or more processors of the base station, may cause the base station to transmit a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs.

Some aspects described herein relate to an apparatus for wireless communication. The apparatus may include means for receiving a configuration that configures a PEI in a first initial downlink bandwidth part, the apparatus being included in a first category of UEs and the first initial downlink bandwidth part being an initial downlink bandwidth part associated with the first category of UEs. The apparatus may include means for monitoring for a PEI in the first initial downlink bandwidth part based at least in part on the configuration.

Some aspects described herein relate to an apparatus for wireless communication. The apparatus may include means for transmitting a configuration that configures a PEI in a first initial downlink bandwidth part. The apparatus may include means for transmitting a PEI for a UE in the first initial downlink bandwidth part based at least in part on the configuration, the UE being included in a first category of UEs and the first initial downlink bandwidth part being an initial downlink bandwidth part associated with the first category of UEs.

Some aspects described herein relate to an apparatus for wireless communication. The apparatus may include means for receiving a configuration that configures a PEI in a second initial downlink bandwidth part, the apparatus being included in a first category of UEs, wherein a first initial downlink bandwidth part is associated with the first category of UEs and the second initial downlink bandwidth part is associated with a second category of UEs. The apparatus may include means for monitoring for a PEI in the second initial downlink bandwidth part based at least in part on the configuration.

Some aspects described herein relate to an apparatus for wireless communication. The apparatus may include means for transmitting a configuration that configures a PEI in a second initial downlink bandwidth part. The apparatus may include means for transmitting a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
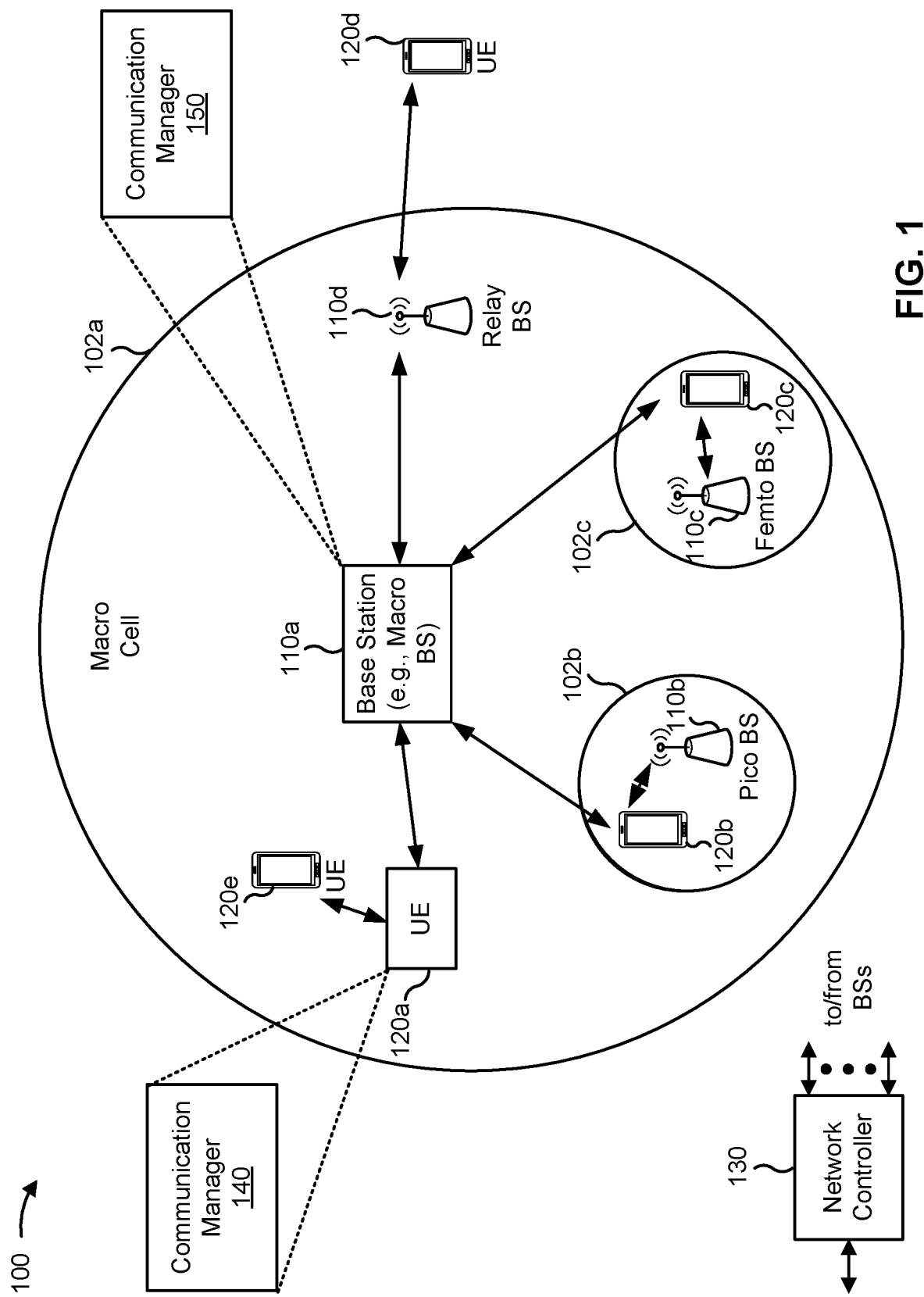
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-14.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 (e.g., a RedCap UE) may include a communication manager 140. As described in more detail elsewhere herein, the communication manager 140 may receive a configuration that configures a paging early indication (PEI) in a first initial downlink bandwidth part, the UE 120 being included in a first category of UEs and the first initial downlink bandwidth part being an initial downlink bandwidth part associated with the first category of UEs; and monitor for a PEI in the first initial downlink bandwidth part based at least in part on the configuration. As described in more detail elsewhere herein, the communication manager 140 may receive a configuration that configures a PEI in a second RedCap initial downlink bandwidth part, the UE 120 being included in a first category of UEs, wherein a first initial downlink bandwidth part is associated with the first category of UEs and the second initial downlink bandwidth part is associated with a second category of UEs; and monitor for a PEI in the second initial downlink bandwidth part based at least in part on the configuration. Additionally, or alternatively, the communication manager 140 may perform one or more other operations described herein.

In some aspects, the base station 110 may include a communication manager 150. As described in more detail elsewhere herein, the communication manager 150 may transmit a configuration that configures a PEI in a first initial downlink bandwidth part; and transmit a PEI for a UE 120 (e.g., a RedCap UE) in the first initial downlink bandwidth part based at least in part on the configuration, the UE 120 being included in a first category of UEs and the first initial downlink bandwidth part being an initial downlink bandwidth part associated with the first category of UEs. As described in more detail elsewhere herein, the communication manager 150 may transmit a configuration that configures a PEI in a second initial downlink bandwidth part; and transmit a PEI for a UE 120 (e.g., a RedCap UE 120) in the second initial downlink bandwidth part based at least in part on the configuration, the UE 120 being included in a first category of UEs, wherein a first initial downlink bandwidth part is associated with the first category of UEs and the second initial downlink bandwidth part is associated with a second category of UEs. Additionally, or alternatively, the communication manager 150 may perform one or more other operations described herein.

As indicated above, FIG. 1 is provided as an example. Other examples may differ from what is described with regard to FIG. 1.

Figure 2:
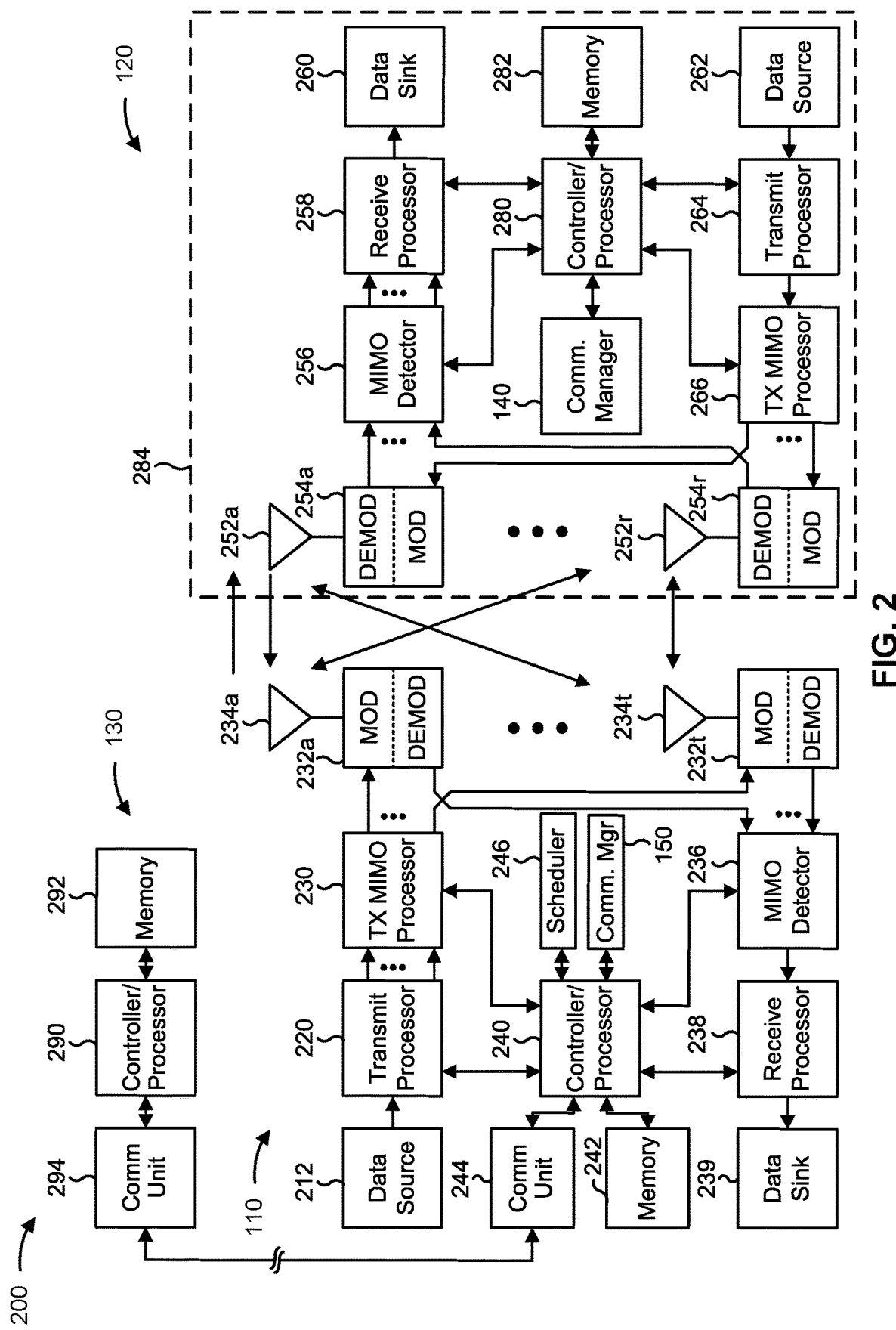
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with PEI for a RedCap UE, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 (e.g., a RedCap UE) includes means for receiving a configuration that configures a PEI in a first initial downlink bandwidth part, the UE 120 being included in a first category of UEs and the first initial downlink bandwidth part being an initial downlink bandwidth part associated with the first category of UEs; and/or means for monitoring for a PEI in the first initial downlink bandwidth part based at least in part on the configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a configuration that configures a PEI in a first initial downlink bandwidth part; and/or means for transmitting a PEI for a UE 120 (e.g., a RedCap UE 120) in the first initial downlink bandwidth part based at least in part on the configuration, the UE 120 being included in a first category of UEs and the first initial downlink bandwidth part being an initial downlink bandwidth part associated with the first category of UEs. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 (e.g., a RedCap UE) includes means for receiving a configuration that configures a PEI in a second initial downlink bandwidth part, the UE 120 being included in a first category of UEs, wherein a first initial downlink bandwidth part is associated with the first category of UEs and the second initial downlink bandwidth part is associated with a second category of UEs; and/or means for monitoring for a PEI in the second initial downlink bandwidth part based at least in part on the configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a configuration that configures a PEI in a second initial downlink bandwidth part; and/or means for transmitting a PEI for a UE 120 (e.g., a RedCap UE) in the second initial downlink bandwidth part based at least in part on the configuration, the UE 120 being included in a first category of UEs, wherein a first initial downlink bandwidth part is associated with the first category of UEs and the second initial downlink bandwidth part is associated with a second category of UEs. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
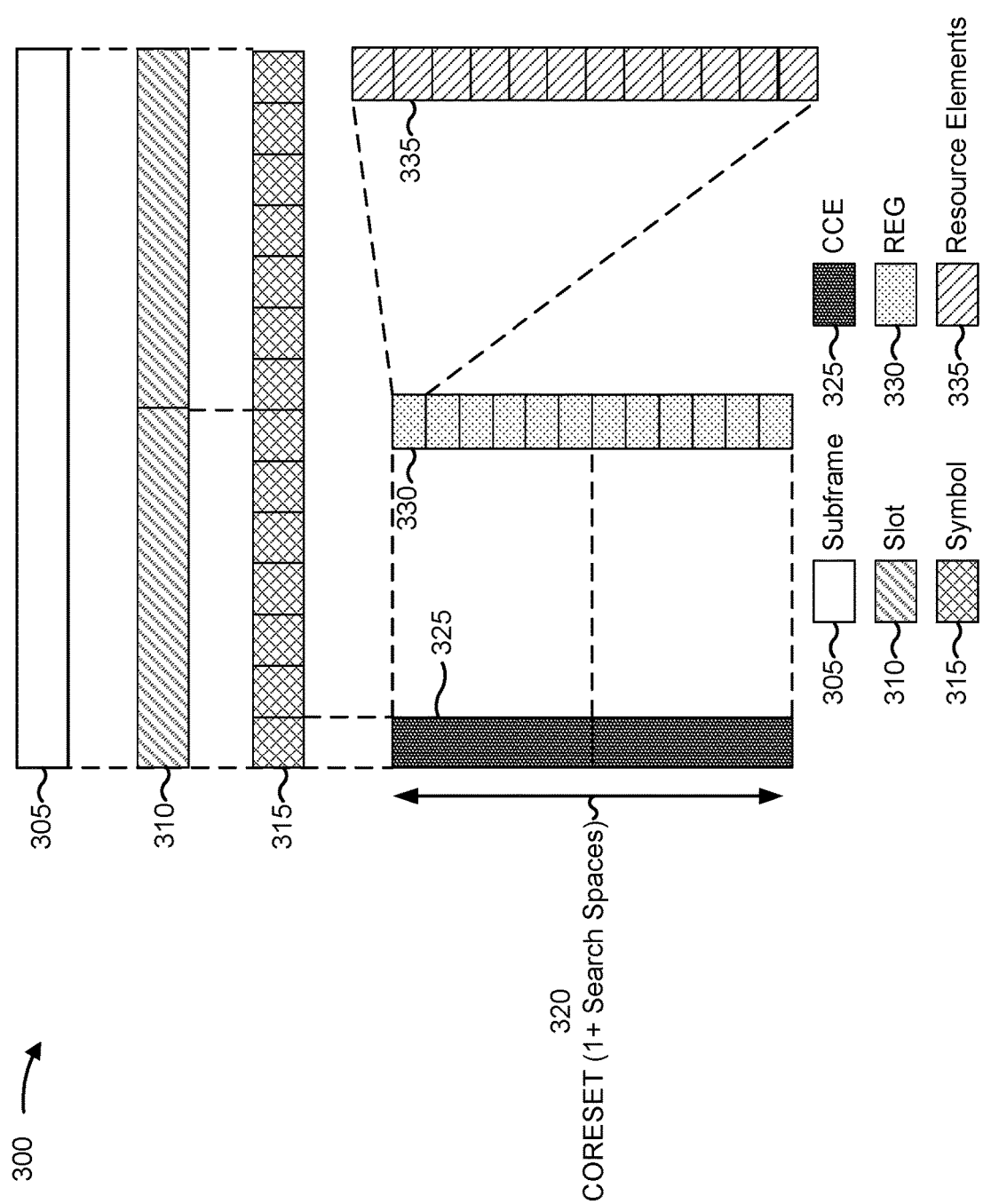
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more physical downlink control channels (PDCCHs) and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space set.

A CORESET 320 may be interleaved or non-interleaved. An interleaved CORESET 320 may have CCE-to-REG mapping such that adjacent CCEs are mapped to scattered REG bundles in the frequency domain (e g, adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

In some aspects, techniques and apparatuses associated with PEI for a RedCap UE described herein may utilize a resource structure similar to described in example 300.

As indicated above, FIG. 3 is provided as an example. Other examples may differ from what is described with respect to FIG. 3.

In a wireless communication system, a UE may during some periods of time not have an active connection with a base station and, therefore, may not be able to receive signaling dedicated to the UE. For example, a UE operating in a radio resource control (RRC) idle mode does not have an RRC connection with a base station and, therefore, cannot receive dedicated signaling from the base station. Rather, the UE only receives broadcast information (e.g., synchronization signal blocks (SSBs), system information blocks (SIBs), or the like). One technique by which the base station can establish communication with the UE during such a period of time is through a paging procedure.

According to a typical paging procedure, the base station sends a paging message to the UE, where the paging message includes a request to wake from the idle mode and reconnect to the network. The paging message is transmitted in a PDSCH communication. Such a communication is herein referred to as a paging PDSCH. Prior to transmitting the paging PDSCH, the base station needs to transmit, and the UE needs to receive, a PDCCH communication scheduling the paging PDSCH. Such a communication is herein referred to as a paging PDCCH. Notably, the paging PDCCH may also include information not used in association with scheduling the paging PDSCH, such as a short message (e.g., in a short message field in downlink control format (DCI) format 1_0, using, for example, two bits). The base station transmits the paging PDCCH and the paging PDSCH within a paging occasion associated with the UE. The paging occasion is a set of resources in which the UE is configured to check for paging messages for the UE.

In practice, when the UE wakes to monitor a paging occasion, timing and/or frequency synchronization between the UE and the base station may be lost. Thus, to obtain reliable paging detection, the UE performs timing/frequency tracking to regain timing/frequency synchronization. For example, the UE may be configured to receive one or more SSBs or tracking reference signals (TRSs), may estimate a timing/frequency mismatch based on the set of SSBs or TRSs, and may compensate for the estimated timing/frequency mismatch accordingly. Therefore, prior to a given configured paging occasion, the UE needs to perform timing/frequency tracking. Then, at the configured paging occasion, the UE needs to receive and decode the paging PDCCH. Here, if the paging PDCCH includes scheduling information for a paging PDSCH, then the UE receives and decodes the paging PDSCH.

However, such an operation is not efficient in terms of UE resource consumption. For example, the base station transmits only one paging PDCCH for all UEs associated with the same paging occasion. Therefore, all UEs associated with the same paging occasion need to monitor the paging PDCCH. Thus, for a given paging occasion, all UEs configured with the paging occasion may need to perform timing/frequency synchronization, after which all of the UEs receive and decode the paging PDCCH. Here, if the paging PDCCH includes scheduling information for a paging PDSCH, then all of the UEs need to decode the paging PDSCH. However, not all of the UEs associated with the paging occasion are paged by the paging PDSCH in most cases and, therefore, UE processing resources and battery power are wasted for UEs associated with the paging occasion for which the paging PDSCH is not intended. Put another way, the paging PDCCH indicates that at least one UE associated with the paging occasion is being paged, so all UEs associated with the paging occasion need to decode the paging PDSCH. This results in wastage of processing resources and battery power of the UEs that were not paged by the paging PDSCH (e.g., since the UEs that were not paged still need to perform timing/frequency synchronization, receive and decode the paging PDCCH, and receive and decode the paging PDSCH).

In some wireless communication systems, to improve efficiency of the paging procedure (i.e., to reduce wastage of UE processing resources and battery power), the base station may transmit a paging early indication (PEI). A PEI is a communication transmitted prior to a paging occasion associated with the UE. In some cases, the PEI may be also transmitted prior to one or more SSBs or TRSs that could be used by the UE to perform timing/frequency synchronization. Generally, the PEI informs the UE of whether the UE should process a paging PDCCH and/or a paging PDSCH in one or more upcoming paging occasions. In practice, a UE may receive a PEI indicating whether a paging PDSCH for at least one UE in a UE group of the UE (e.g., a group of UEs, including the UE, that is associated with the one or more upcoming paging occasions) or a UE sub-group of the UE (e.g., a subset of UEs, from the group of UEs, that includes the UE) will be included in an upcoming paging occasion. If the PEI indicates that at least one UE in the UE group or UE sub-group of the UE will be paged in the upcoming paging occasion, then the UE may wake to perform timing/frequency synchronization, perform paging PDCCH reception and decoding, perform paging PDSCH reception and decoding for the upcoming paging occasion, or perform one or more other operations. Conversely, if the PEI indicates that no UE in the UE group or UE sub-group will be paged in the upcoming paging occasion, then the UE may skip timing/frequency synchronization, skip paging PDCCH reception and decoding, and skip paging PDSCH reception and decoding for the upcoming paging occasion. In this way, processing resources and battery power of the UE can be conserved.

In some systems, PEIs are PDCCH-based. A configuration for monitoring for a PDCCH-based PEI may indicate, for example, a CORESET for a frequency domain resource allocation of the PDCCH-based PEI, a search space (SS) set for a time domain occasion of the PDCCH-based PEI, an aggregation level associated with the PDCCH-based PEI, or a quantity of PDCCH candidates associated with the PDCCH-based PEI.

Further, in some systems, a base station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the first category, and may be referred to as a non-RedCap UE, a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

For a non-RedCap UE, a PEI is transmitted in the same bandwidth part as a paging PDCCH, which is referred to as an initial downlink bandwidth part for idle and inactive mode UEs (also referred to herein as a non-RedCap UE initial downlink bandwidth part or a second initial downlink bandwidth part). However, an applicable wireless communication standard may define a separate (in the frequency domain) initial downlink bandwidth part for RedCap UEs in order to, for example, facilitate coexistence of RedCap and non-RedCap UEs in the same network. In such a case, whether a RedCap UE monitors paging occasions in the RedCap initial downlink bandwidth part (also referred to herein as a first initial downlink bandwidth part) and whether one or more SSBs or TRS are communicated in the RedCap initial downlink bandwidth part should be defined, and configured at the RedCap UE accordingly. Notably, there may be a dedicated non-initial downlink bandwidth part for RedCap UEs operating in connected mode, but idle/inactive mode RedCap UEs may not operate in this dedicated bandwidth part.

Some aspects described herein provide techniques and apparatuses for PEI for a UE, such as a RedCap UE. In some aspects, a base station may transmit, and a UE may receive, a configuration that configures a PEI in a first initial downlink bandwidth part (e.g., a RedCap initial downlink bandwidth part), the UE being included in a first category of UEs (e.g., RedCap UEs) and the first initial downlink bandwidth part being associated with the first category of UEs. Here, the base station may transmit a PEI for the UE in the first initial downlink bandwidth part based at least in part on the configuration, and the UE may monitor for the PEI in the first initial downlink bandwidth part based at least in part on the configuration. Alternatively, in some aspects, a base station may transmit, and a UE may receive, a configuration that configures a PEI in a second initial downlink bandwidth part (e.g., a non-RedCap initial downlink bandwidth part), the UE being included in a first category of UEs (e.g., RedCap UEs), wherein a first initial downlink bandwidth part (e.g., a RedCap initial downlink bandwidth part) is associated with the first category of UEs and the second initial downlink bandwidth part is associated with a second category of UEs (e.g., non-RedCap UEs). Here, the base station may transmit a PEI for the UE in the second initial downlink bandwidth part based at least in part on the configuration, and the UE may monitor for the PEI in the second initial downlink bandwidth part based at least in part on the configuration. Additional details are provided below.

Figure 4:
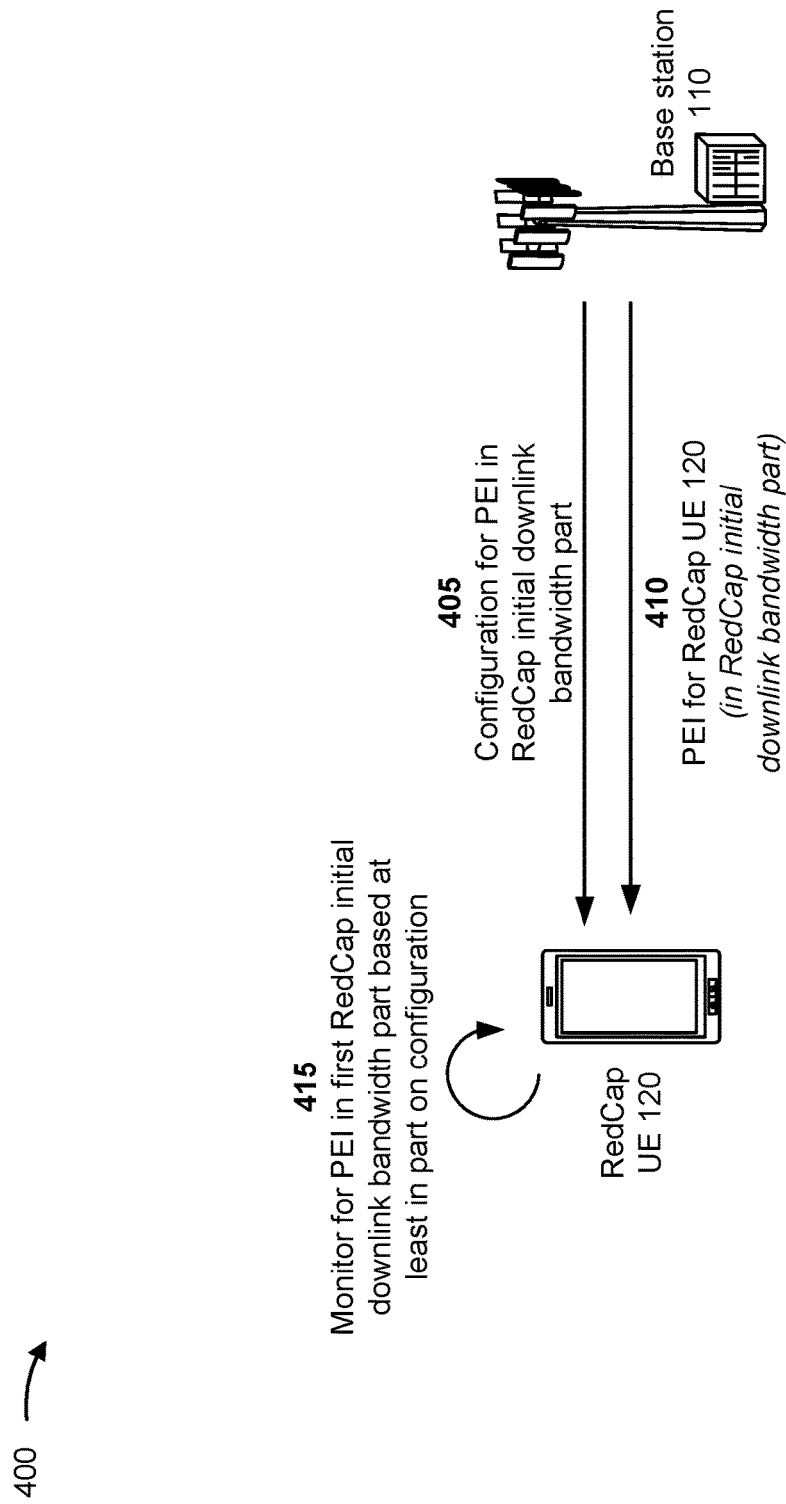
FIGS. 4 and 5 are diagrams illustrating examples associated with paging early indication (PEI) for a reduced capability (RedCap) UE, in accordance with the present disclosure.

FIG. 4 is a diagram illustrating an example 400 associated with PEI for a RedCap UE, in accordance with the present disclosure. Example 400 is an example in which a RedCap UE 120 is configured to monitor for a PEI in a RedCap initial downlink bandwidth part. Notably, while example 400 is described in the context of RedCap (e.g., RedCap UEs, RedCap initial downlink bandwidth parts, and non-RedCap initial downlink bandwidth parts), the techniques and apparatuses described with respect to example 400 may be applied in other contexts in which different initial downlink bandwidth parts are associated with different categories or types of UEs.

As shown in FIG. 4, example 400 includes communication between a base station 110 and a RedCap UE 120. In some aspects, the base station 110 and the RedCap UE 120 may be included in a wireless network, such as wireless network 100. The base station 110 and the RedCap UE 120 may communicate via a wireless access link, which may include an uplink and a downlink.

As shown by reference 405, the base station 110 may transmit, and the RedCap UE 120 may receive, a configuration that configures a PEI in a RedCap initial downlink bandwidth part. That is, the base station 110 may configure the RedCap UE 120 with a PEI in the RedCap initial downlink bandwidth part (e.g., to enable the RedCap UE 120 to monitor for a PEI within the RedCap initial downlink bandwidth part). As shown by reference 410, the base station 110 may transmit a PEI for the RedCap UE 120 in the RedCap initial downlink bandwidth part based at least in part on the configuration.

As shown by reference 415, the RedCap UE 120 may monitor for a PEI in the RedCap initial downlink bandwidth part based at least in part on the configuration. In some aspects, the RedCap UE 120 may receive the PEI transmitted by the base station 110 in the RedCap initial downlink bandwidth part based at least in part on monitoring for the PEI in the RedCap initial downlink bandwidth part.

In some aspects, a paging occasion for the RedCap UE 120 is not configured in the RedCap initial downlink bandwidth part. That is, in some aspects, the base station 110 does not configure a paging occasion for the RedCap UE 120 in the RedCap initial downlink bandwidth part.

In some aspects, when the paging occasion for the RedCap UE 120 is not configured in the RedCap initial downlink bandwidth part, the RedCap UE 120 may receive the PEI in the RedCap initial downlink bandwidth part based at least in part on monitoring for the PEI in the RedCap initial downlink bandwidth part. Here, the RedCap UE 120 may then switch from the RedCap initial downlink bandwidth part to a non-RedCap initial downlink bandwidth part. That is, after receiving the PEI in the RedCap initial downlink bandwidth part, the RedCap UE 120 may perform bandwidth part switching to switch from the RedCap initial downlink bandwidth part to the non-RedCap initial downlink bandwidth part if a UE group or UE subgroup including the RedCap UE 120 is paged. The RedCap UE 120 may then process a paging occasion for the RedCap UE 120 in the non-RedCap initial downlink bandwidth part after switching from the RedCap initial downlink bandwidth part to the non-RedCap initial downlink bandwidth part. In some aspects, a minimum amount of time between the PEI and the paging occasion for the RedCap UE 120 corresponds to a bandwidth part switching delay supported by the RedCap UE 120. That is, in some aspects, a minimum interval between the PEI and the paging occasion is a bandwidth part switching delay supported by the RedCap UE 120.

In some aspects, the PEI being configured in the RedCap initial downlink bandwidth part offloads PEIs for RedCap UEs 120 to the RedCap initial downlink bandwidth part (rather than utilizing the non-RedCap initial downlink bandwidth part for communicating PEIs for RedCap UEs 120), thereby reducing a likelihood of a collision between a PEI for a RedCap UE 120 and a legacy channel or signal in the non-RedCap initial downlink bandwidth part.

Alternatively, in some aspects, the base station 110 may transmit, and the RedCap UE 120 may receive, a configuration that configures a paging occasion for the RedCap UE 120 in the RedCap initial downlink bandwidth part. That is, in some aspects, the base station 110 configures a paging occasion for the RedCap UE 120 in the RedCap initial downlink bandwidth part.

In some aspects, when the paging occasion for the RedCap UE 120 is configured in the RedCap initial downlink bandwidth part, the RedCap UE 120 may receive the PEI in the RedCap initial downlink bandwidth part based at least in part on monitoring for the PEI in the RedCap initial downlink bandwidth part. The RedCap UE 120 may then process a paging occasion for the RedCap UE 120 in the RedCap initial downlink bandwidth part after receiving the PEI in the RedCap initial downlink bandwidth part if the PEI indicates that the UE group or UE subgroup including the RedCap UE 120 is paged.

In some aspects, the PEI and the paging occasion being configured in the RedCap initial downlink bandwidth part enables the RedCap UE 120 to monitor for the PEI and the paging PDCCH in the same bandwidth part, meaning that the RedCap UE 120 need not perform bandwidth switching, thereby conserving battery power and processing resources.

In some aspects, when the base station 110 configures a paging occasion for the RedCap UE 120 in the RedCap initial downlink bandwidth part, the RedCap UE 120 may monitor for the PEI based at least in part on a CORESET or a search space set indicated in the configuration that configures the paging occasion for the RedCap UE 120 in the RedCap initial downlink bandwidth part. That is, when the base station 110 configures the paging occasion for the RedCap UE 120 in the RedCap initial downlink bandwidth part, the base station 110 may further configure the RedCap UE 120 to monitor for the PEI in the same CORESET or the same search space set as for the paging PDCCH in the RedCap initial downlink bandwidth part.

Additionally, or alternatively, when the base station 110 configures a paging occasion for the RedCap UE 120 in the RedCap initial downlink bandwidth part, the RedCap UE 120 may monitor for the PEI based at least in part on a CORESET or a search space set indicated in a configuration separate from the configuration that configures the paging occasion for the RedCap UE 120 in the RedCap initial downlink bandwidth part. That is, when the base station 110 configures the paging occasion for the RedCap UE 120 in the RedCap initial downlink bandwidth part, the base station 110 may further configure the RedCap UE 120 to monitor for the PEI in a separately configured CORESET or separately configured search space set in the RedCap initial downlink bandwidth part.

In some aspects, the base station 110 may transmit, and the RedCap UE 120 may receive, an SSB or a TRS in the RedCap initial downlink bandwidth part. Additionally, or alternatively, the base station 110 may transmit, and the RedCap UE 120 may receive, an SSB or a TRS in the non-RedCap initial downlink bandwidth part (e.g., when the SSB or the TRS is not communicated in the RedCap initial downlink bandwidth part).

In some aspects, a search space set based at least in part on which the RedCap UE 120 monitors for the PEI is a search space set based at least in part on which non-RedCap UEs 120 monitor for PEIs. That is, in some aspects when the RedCap UE 120 is to receive the PEI in the RedCap initial downlink bandwidth part, the RedCap UE 120 may be configured to reuse the same PEI PDCCH search space set as that used by a non-RedCap UE 120. Such an approach reduces signaling overhead associated with configuration of search space sets. Notably, the search space set is associated with a time domain location of PDCCH monitoring, and in some aspects the same search space set configuration can be used in different bandwidth parts.

Alternatively, in some aspects, the search space set based at least in part on which the RedCap UE 120 monitors for the PEI is configured separately from a search space set based at least in part on which non-RedCap UEs 120 monitor for PEIs. That is, in some aspects when the RedCap UE 120 is to receive the PEI in the RedCap initial downlink bandwidth part, the base station 110 provides a configuration for a PEI PDCCH search space set for the RedCap UE 120 that is separate from that configured for a non-RedCap UE 120. Such an approach enables the base station 110 to configure a different (e.g., higher) aggregation level or a different (e.g., lower) quantity of PDCCH candidates for the PEI PDCCH, which can enable a RedCap coverage boost or a reduced PDCCH decoding complexity.

In some aspects, the RedCap UE 120 may refrain from decoding a PDCCH candidate, associated with the PEI or a paging PDCCH, that overlaps a non-cell-defining SSB (NCD-SSB) or a TRS in the RedCap initial downlink bandwidth part. That is, when the RedCap UE 120 receives the PEI in the RedCap initial downlink bandwidth part, if the base station 110 transmits an NCD-SSB or a TRS in the RedCap initial downlink bandwidth part, the RedCap UE 120 may refrain from decoding a PDCCH candidate that overlaps with the NCD-SSB or the TRS (i.e., the RedCap UE 120 may assume that the PDCCH candidate is not transmitted).

Alternatively, in some aspects, the RedCap UE 120 may decode a PDCCH candidate, associated with the PEI or a paging PDCCH, that overlaps an NCD-SSB or a TRS in the RedCap initial downlink bandwidth part. That is, when the RedCap UE 120 receives the PEI in the RedCap initial downlink bandwidth part, if the base station 110 transmits an NCD-SSB or a TRS in the RedCap initial downlink bandwidth part, the RedCap UE 120 may decode a PDCCH candidate that overlaps with the NCD-SSB or the TRS (i.e., the RedCap UE 120 may assume that the PDCCH can be transmitted in the PDCCH candidate).

In some aspects, the RedCap UE 120 may refrain from decoding a PDCCH candidate, associated with the PEI or a paging PDCCH, that overlaps a cell-defining SSB (CD-SSB) in the RedCap initial downlink bandwidth part. That is, when the RedCap UE 120 receives the PEI in the RedCap initial downlink bandwidth part, if the base station 110 transmits a CD-SSB in the RedCap initial downlink bandwidth part, the RedCap UE 120 may refrain from decoding the PDCCH candidate.

Notably, if the base station 110 transmits an NCD-SSB in the RedCap initial downlink bandwidth part, then it is possible that a bandwidth of the NCD-SSB at least partially overlaps with the RedCap initial downlink bandwidth part. Here, the NCD-SSB may be useful for idle and inactive mode UEs 120 (e.g., for a partial synchronization sequence for tracking loop update). In some aspects, when the RedCap UE 120 receives the PEI in the RedCap initial downlink bandwidth part, if the base station 110 transmits an NCD-SSB or a TRS in the RedCap initial downlink bandwidth part, a first signal configuration (e.g., a first configuration for one or more SSBs or TRSs) may have N REs (or RBs) in the bandwidth part and a second signal configuration (e.g., a second configuration for one or more SSBs or TRSs) may have AREs (or RBs) in the bandwidth part. Here, if N is less than M, then a quantity of SSBs or TRSs between a PEI and a paging occasion for the first signal configuration may not be less than a quantity of SSBs or TRSs between the PEI and a paging occasion for the second signal configuration. In other words, in some aspects, a quantity of resources in the RedCap initial downlink bandwidth part indicated by a first signal configuration may be less than a quantity of resources in the RedCap initial downlink bandwidth part indicated by a second signal configuration, and a quantity of signals between the PEI and a paging occasion for the first signal configuration is not less than a quantity of signals between the PEI and the paging occasion for the second signal configuration. Additionally, or alternatively, if N is less than M, then an interval between the PEI and the paging occasion for the first signal configuration may not be less than an interval between the PEI and the paging occasion for the second signal configuration. In other words, in some aspects, a quantity of resources in the RedCap initial downlink bandwidth part indicated by the first signal configuration may be less than a quantity of resources in the RedCap initial downlink bandwidth part indicated by the second signal configuration, and an amount of time between the PEI and the paging occasion for the first signal configuration is not less than an amount of time between the PEI and the paging occasion for the second signal configuration. In this way, an amount of reference signal resources available for the RedCap UE 120 to provide reasonable tracking loop quality may be maintained.

As indicated above, FIG. 4 is provided as an example. Other examples may differ from what is described with respect to FIG. 4.

Figure 5:
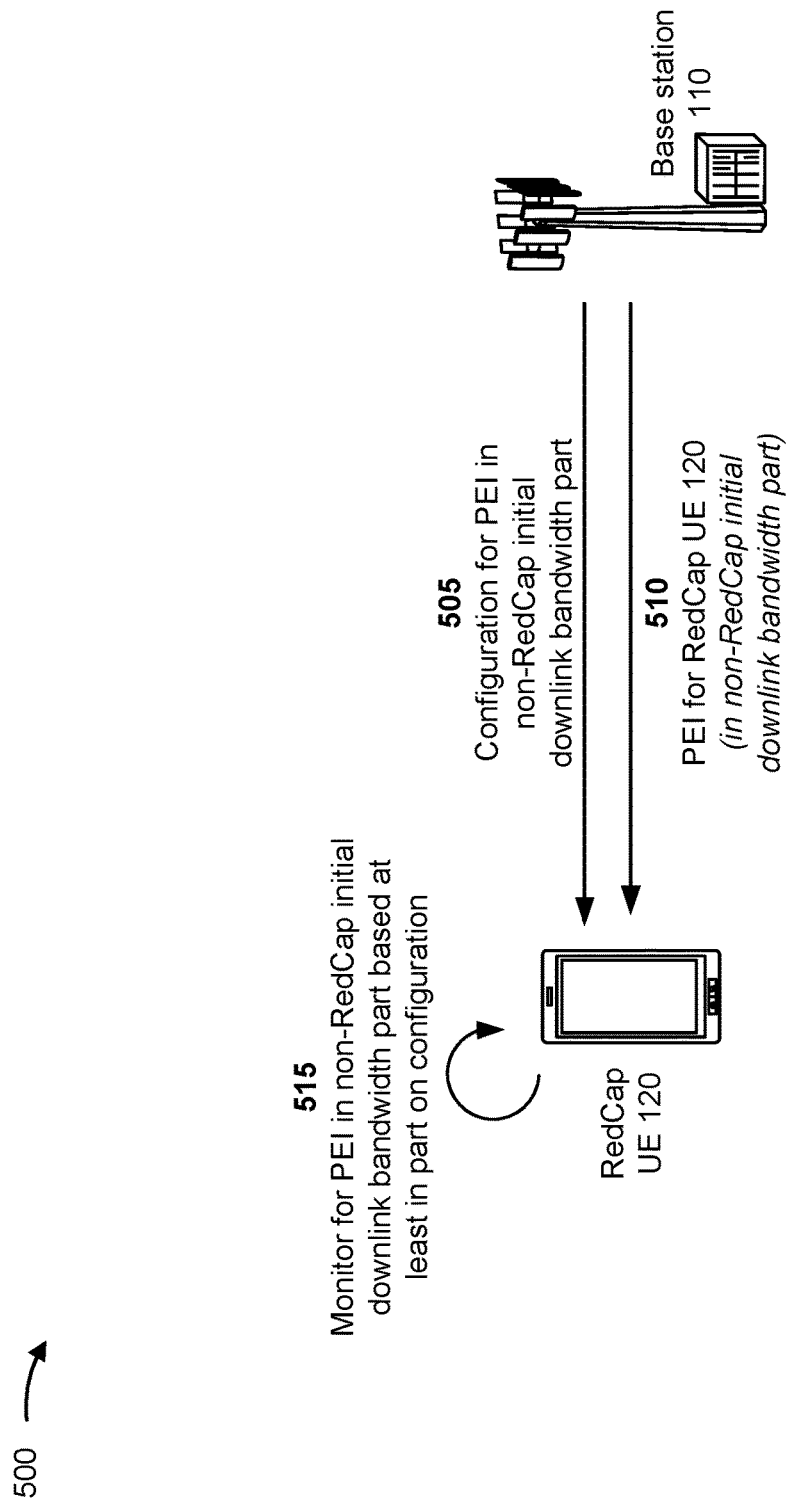

FIG. 5 is a diagram illustrating an example 500 associated with PEI for a RedCap UE, in accordance with the present disclosure. Example 500 is an example in which a RedCap UE 120 is configured to monitor for a PEI in a non-RedCap initial downlink bandwidth part. Notably, while example 500 is described in the context of RedCap (e.g., RedCap UEs, RedCap initial downlink bandwidth parts, and non-RedCap initial downlink bandwidth parts), the techniques and apparatuses described with respect to example 500 may be applied in other contexts in which different initial downlink bandwidth parts are associated with different categories or types of UEs.

As shown in FIG. 5, example 500 includes communication between a base station 110 and a RedCap UE 120. In some aspects, the base station 110 and the RedCap UE 120 may be included in a wireless network, such as wireless network 100. The base station 110 and the RedCap UE 120 may communicate via a wireless access link, which may include an uplink and a downlink.

As shown by reference 505, the base station 110 may transmit, and the RedCap UE 120 may receive, a configuration that configures a PEI in a non-RedCap initial downlink bandwidth part. As shown by reference 510, the base station 110 may transmit a PEI for the RedCap UE 120 in the non-RedCap initial downlink bandwidth part based at least in part on the configuration.

As shown by reference 515, the RedCap UE 120 may monitor for a PEI in the non-RedCap initial downlink bandwidth part based at least in part on the configuration. In some aspects, the RedCap UE 120 may receive the PEI transmitted by the base station 110 in the non-RedCap initial downlink bandwidth part based at least in part on monitoring for the PEI in the RedCap initial downlink bandwidth part.

In some aspects, the base station 110 may transmit, and the RedCap UE 120 may receive, a configuration that configures a paging occasion for the RedCap UE 120 in the RedCap initial downlink bandwidth part. That is, in some aspects, the base station 110 configures a paging occasion for the RedCap UE 120 in the RedCap initial downlink bandwidth part. In some aspects, an SSB or a TRS is not configured in the RedCap initial downlink bandwidth part. Thus, in some aspects, the base station 110 may configure a paging occasion for the RedCap UE 120 in the RedCap initial downlink bandwidth part, but may not configure an SSB or a TRS in the RedCap initial downlink bandwidth part.

In some aspects, when the base station 110 configures a paging occasion for the RedCap UE 120 in the RedCap initial downlink bandwidth part and does not configure an SSB or a TRS in the RedCap initial downlink bandwidth part, the RedCap UE 120 may receive the PEI in the non-RedCap initial downlink bandwidth part based at least in part on monitoring for the PEI in the non-RedCap initial downlink bandwidth part, and may switch from the non-RedCap initial downlink bandwidth part to the RedCap initial downlink bandwidth part after receiving the PEI in the non-RedCap initial downlink bandwidth part. The RedCap UE 120 may then process the paging occasion for the RedCap UE in the RedCap initial downlink bandwidth part after switching from the non-RedCap initial downlink bandwidth part to the RedCap initial downlink bandwidth part. In some aspects, a minimum amount of time between the PEI and the paging occasion for the RedCap UE 120 corresponds to a bandwidth part switching delay supported by the RedCap UE 120. That is, in some aspects, the minimum interval between the PEI and the paging occasion is a bandwidth part switching delay supported by the RedCap UE 120. Such an approach may be used when there are one or more SSBs or TRSs between PEI and the paging occasion so that the RedCap UE 120 can monitor one or more additional SSBs or TRSs after the PEI for tracking loop refinement (if the PEI indicates that the RedCap UE 120 is paged).

In some aspects, a PDCCH based at least in part on which the RedCap UE 120 monitors for the PEI is different from a PDCCH based at least in part on which non-RedCap Ues 120 monitor for PEIs. That is, in some aspects, a PEI PDCCH configuration can be based at least in part on the use of different PEI PDCCHs for RedCap Ues 120 and non-RedCap Ues 120. Additionally, or alternatively, a CORESET or a search space set based at least in part on which the RedCap UE 120 monitors for the PEI may be separately configured for monitoring for PEIs by RedCap Ues 120. That is, in some aspects, a PEI PDCCH configuration can be based at least in part on the use of separately configured dedicated CORESETs or search space sets for PEI monitoring for RedCap Ues 120. Additionally, or alternatively, a location at which the RedCap UE 120 monitors for the PEI may be different from a location at which non-RedCap Ues 120 monitor for PEIs. That is, in some aspects, a PEI PDCCH configuration can be based at least in part on the use of different PEI locations for RedCap Ues 120 and non-RedCap Ues 120. In some aspects, the use of different PEI PDCCHS, separately configured CORESETs and/or search space sets, or different PEI locations may increase a signaling capacity for the PEI when different PDCCHs are used for RedCap Ues 120 and non-RedCap Ues 120 to receive PEIs in the same bandwidth part.

As indicated above, FIG. 5 is provided as an example. Other examples may differ from what is described with respect to FIG. 5.

Figure 6:
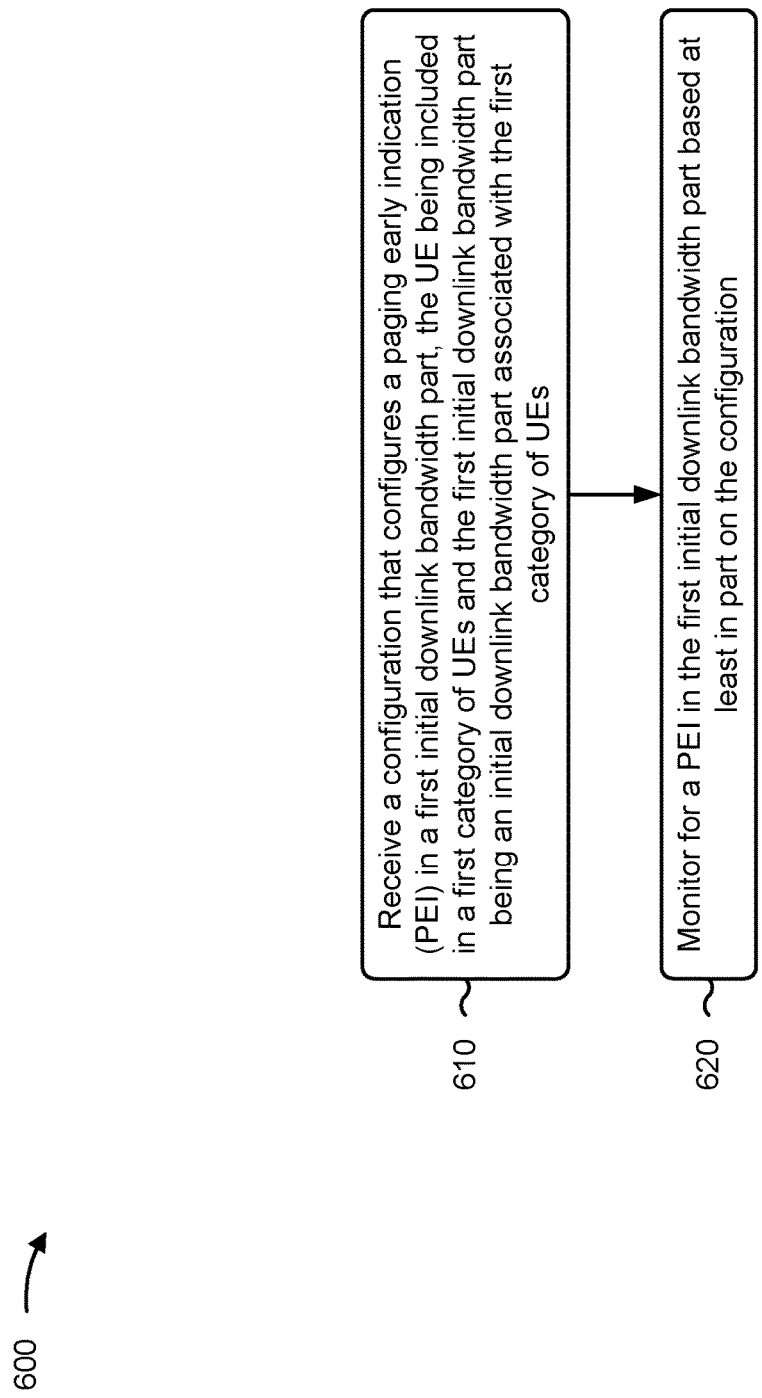
FIGS. 6-9 are diagrams illustrating example processes associated with PEI for a RedCap UE, in accordance with the present disclosure.

FIG. 6 is a diagram illustrating an example process 600 performed, for example, by a UE (e.g., a RedCap UE), in accordance with the present disclosure. Example process 600 is an example where the UE (e.g., a UE 120) performs operations associated with PEI for a UE.

As shown in FIG. 6, in some aspects, process 600 may include receiving a configuration that configures a PEI in a first initial downlink bandwidth part, the UE being included in a first category of UEs and the first initial downlink bandwidth part being an initial downlink bandwidth part associated with the first category of UEs (block 610). For example, the UE (e.g., using communication manager 140 and/or reception component 1002, depicted in FIG. 10) may receive a configuration that configures a PEI in a first initial downlink bandwidth part, the UE being included in a first category of UEs and the first initial downlink bandwidth part being an initial downlink bandwidth part associated with the first category of UEs, as described above.

As further shown in FIG. 6, in some aspects, process 600 may include monitoring for a PEI in the first initial downlink bandwidth part based at least in part on the configuration (block 620). For example, the UE (e.g., using communication manager 140 and/or monitoring component 1008, depicted in FIG. 10) may monitor for a PEI in the first initial downlink bandwidth part based at least in part on the configuration, as described above.

Process 600 may include additional aspects, such as any single aspect or any combination of aspects described below and/or in connection with one or more other processes described elsewhere herein.

In a first aspect, a paging occasion for the UE is not configured in the first initial downlink bandwidth part.

In a second aspect, alone or in combination with the first aspect, process 600 includes receiving the PEI in the first initial downlink bandwidth part based at least in part on monitoring for the PEI in the first initial downlink bandwidth part, and switching from the first initial downlink bandwidth part to a second initial downlink bandwidth part after receiving the PEI in the first initial downlink bandwidth part.

In a third aspect, alone or in combination with one or more of the first and second aspects, process 600 includes processing a paging occasion for the UE in the second initial downlink bandwidth part after switching from the first initial downlink bandwidth part to the second initial downlink bandwidth part.

In a fourth aspect, alone or in combination with one or more of the first through third aspects, a minimum amount of time between the PEI and a paging occasion for the UE corresponds to a bandwidth part switching delay supported by the UE.

In a fifth aspect, alone or in combination with one or more of the first through fourth aspects, process 600 includes receiving an SSB or a TRS in the first initial downlink bandwidth part.

In a sixth aspect, alone or in combination with one or more of the first through fifth aspects, process 600 includes receiving an SSB or a TRS in a second initial downlink bandwidth part, wherein the SSB or the TRS is not received in the first initial downlink bandwidth part.

In a seventh aspect, alone or in combination with one or more of the first through sixth aspects, process 600 includes receiving a configuration that configures a paging occasion for the UE in the first initial downlink bandwidth part.

In an eighth aspect, alone or in combination with one or more of the first through seventh aspects, the UE is to monitor for the PEI based at least in part on at least one of a CORESET or a search space set indicated in the configuration that configures the paging occasion for the UE in the first initial downlink bandwidth part.

In a ninth aspect, alone or in combination with one or more of the first through eighth aspects, the UE is to monitor for the PEI based at least in part on at least one of a CORESET or a search space set indicated in a configuration separate from the configuration that configures the paging occasion for the UE in the first initial downlink bandwidth part.

In a tenth aspect, alone or in combination with one or more of the first through ninth aspects, process 600 includes receiving the PEI in the first initial downlink bandwidth part based at least in part on monitoring for the PEI in the first initial downlink bandwidth part, and processing a paging occasion for the UE in the first initial downlink bandwidth part after receiving the PEI in the first initial downlink bandwidth part.

In an eleventh aspect, alone or in combination with one or more of the first through tenth aspects, a search space set based at least in part on which the UE monitors for the PEI is a search space set based at least in part on which UEs included in a second category of UEs monitor for PEIs.

In a twelfth aspect, alone or in combination with one or more of the first through eleventh aspects, a search space set based at least in part on which the UE monitors for the PEI is configured separately from a search space set based at least in part on which UEs included in a second category of UEs monitor for PEIs.

In a thirteenth aspect, alone or in combination with one or more of the first through twelfth aspects, process 600 includes refraining from decoding a PDCCH candidate, associated with the PEI or a paging PDCCH, that overlaps at least one of an NCD-SSB or a TRS in the first initial downlink bandwidth part.

In a fourteenth aspect, alone or in combination with one or more of the first through thirteenth aspects, process 600 includes decoding a PDCCH candidate, associated with the PEI or a paging PDCCH, that overlaps at least one of an NCD-SSB or a TRS in the first initial downlink bandwidth part.

In a fifteenth aspect, alone or in combination with one or more of the first through fourteenth aspects, process 600 includes refraining from decoding a PDCCH candidate, associated with the PEI or a paging PDCCH, that overlaps a CD-SSB in the first initial downlink bandwidth part.

In a sixteenth aspect, alone or in combination with one or more of the first through fifteenth aspects, a quantity of resources in the first initial downlink bandwidth part indicated by a first signal configuration is less than a quantity of resources in the first initial downlink bandwidth part indicated by a second signal configuration, and a quantity of signals between the PEI and a paging occasion for the first signal configuration is not less than a quantity of signals between the PEI and the paging occasion for the second signal configuration.

In a seventeenth aspect, alone or in combination with one or more of the first through sixteenth aspects, a quantity of resources in the first initial downlink bandwidth part indicated by a first signal configuration is less than a quantity of resources in the first initial downlink bandwidth part indicated by a second signal configuration, and an amount of time between the PEI and a paging occasion for the first signal configuration is not less than an amount of time between the PEI and the paging occasion for the second signal configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
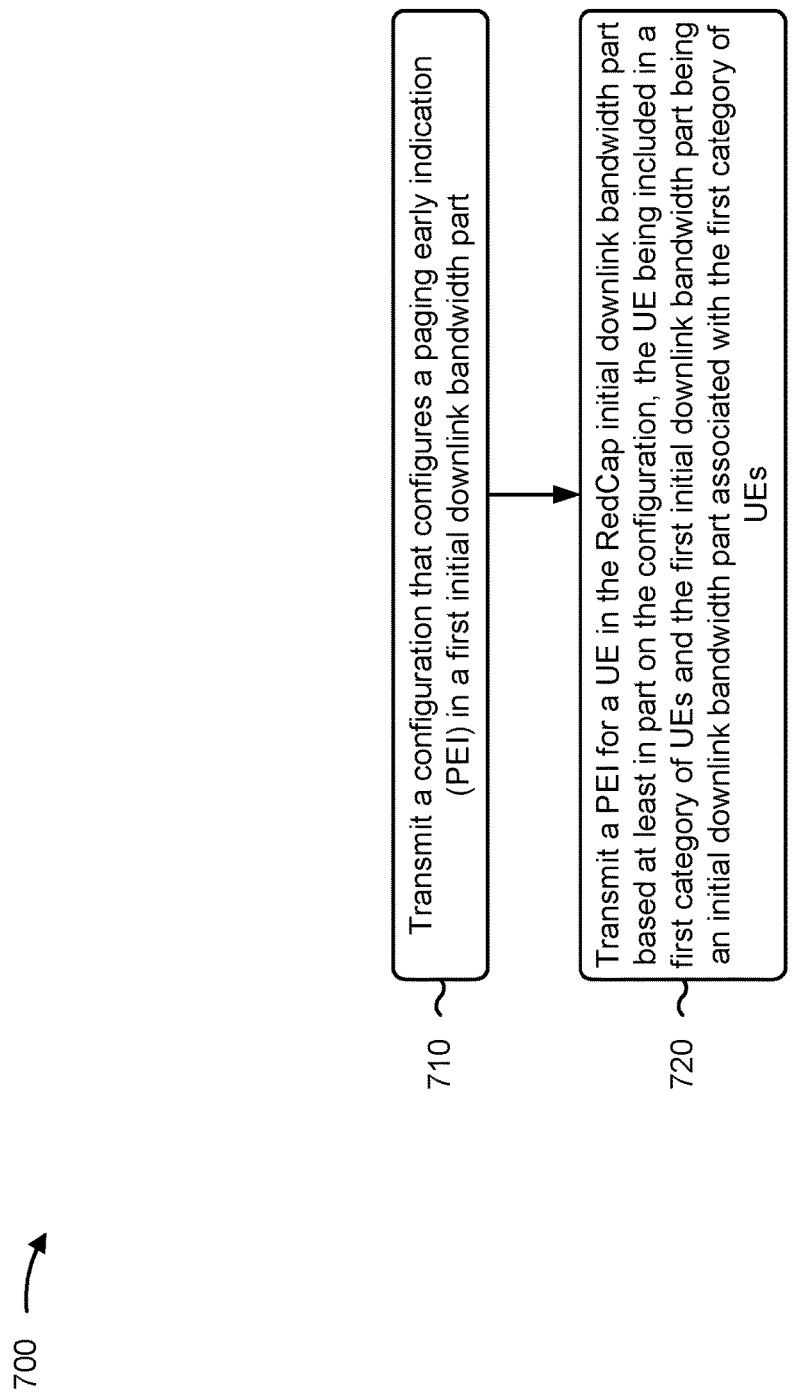

FIG. 7 is a diagram illustrating an example process 700 performed, for example, by a base station, in accordance with the present disclosure. Example process 700 is an example where the base station (e.g., base station 110) performs operations associated with PEI for a UE.

As shown in FIG. 7, in some aspects, process 700 may include transmitting a configuration that configures a PEI in a first initial downlink bandwidth part (block 710). For example, the base station (e.g., using communication manager 150 and/or transmission component 1104, depicted in FIG. 11) may transmit a configuration that configures a PEI in a first initial downlink bandwidth part, as described above.

As further shown in FIG. 7, in some aspects, process 700 may include transmitting a PEI for a UE in the first initial downlink bandwidth part based at least in part on the configuration, the UE being included in a first category of UEs and the first initial downlink bandwidth part being an initial downlink bandwidth part associated with the first category of UEs (block 720). For example, the base station (e.g., using communication manager 150 and/or transmission component 1104, depicted in FIG. 11) may transmit a PEI for a UE in the first initial downlink bandwidth part based at least in part on the configuration, the UE being included in a first category of UEs and the first initial downlink bandwidth part being an initial downlink bandwidth part associated with the first category of UEs, as described above.

Process 700 may include additional aspects, such as any single aspect or any combination of aspects described below and/or in connection with one or more other processes described elsewhere herein.

In a first aspect, a paging occasion for the UE is not configured in the first initial downlink bandwidth part.

In a second aspect, alone or in combination with the first aspect, a minimum amount of time between the PEI and a paging occasion for the UE corresponds to a bandwidth part switching delay supported by the UE.

In a third aspect, alone or in combination with one or more of the first and second aspects, process 700 includes transmitting an SSB or a TRS in the first initial downlink bandwidth part.

In a fourth aspect, alone or in combination with one or more of the first through third aspects, process 700 includes transmitting an SSB or a TRS in a second initial downlink bandwidth part, wherein the SSB or the TRS is not transmitted in the first initial downlink bandwidth part.

In a fifth aspect, alone or in combination with one or more of the first through fourth aspects, process 700 includes transmitting a configuration that configures a paging occasion for the UE in the first initial downlink bandwidth part.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
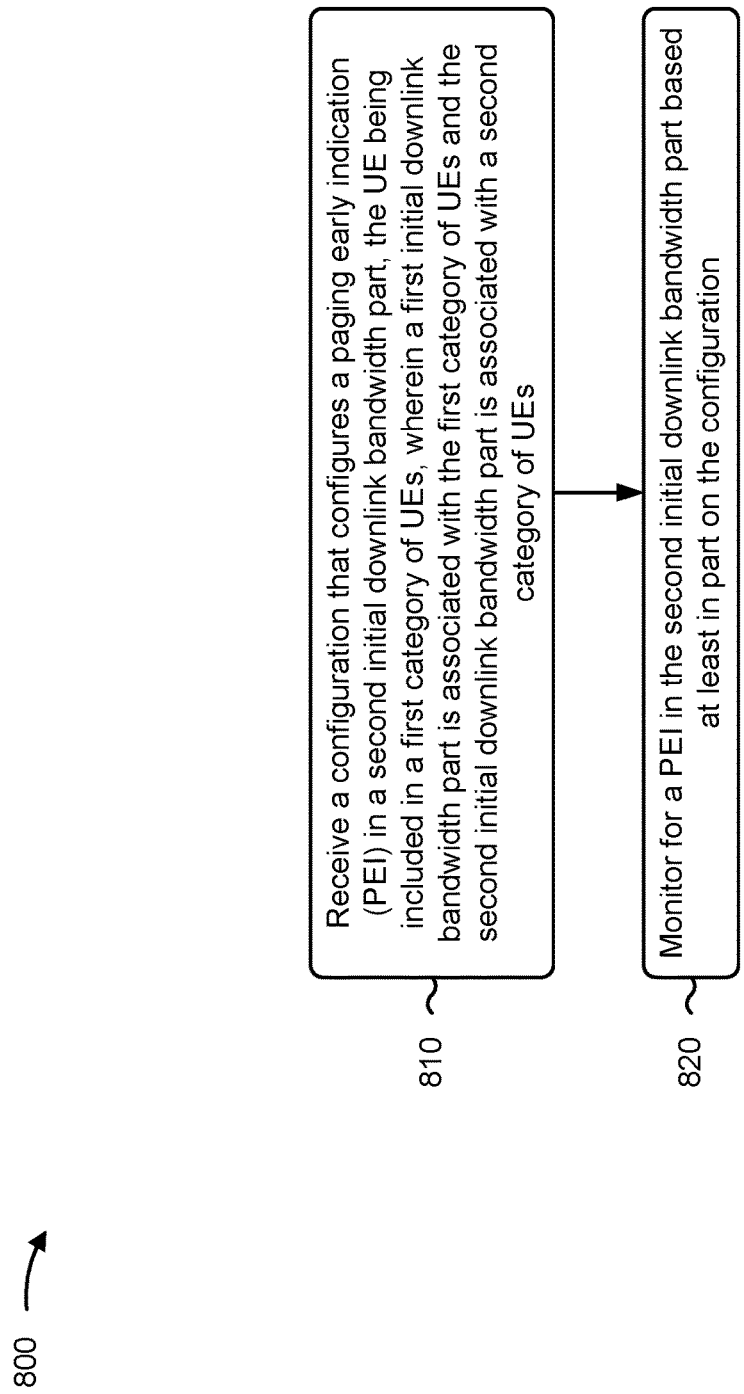

FIG. 8 is a diagram illustrating an example process 800 performed, for example, by a UE (e.g., a RedCap UE), in accordance with the present disclosure. Example process 800 is an example where the UE (e.g., UE 120) performs operations associated with PEI for a UE.

As shown in FIG. 8, in some aspects, process 800 may include receiving a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs (block 810). For example, the UE (e.g., using communication manager 140 and/or reception component 1002, depicted in FIG. 10) may receive a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs, as described above.

As further shown in FIG. 8, in some aspects, process 800 may include monitoring for a PEI in the second initial downlink bandwidth part based at least in part on the configuration (block 820). For example, the UE (e.g., using communication manager 140 and/or monitoring component 1008, depicted in FIG. 10) may monitor for a PEI in the second initial downlink bandwidth part based at least in part on the configuration, as described above.

Process 800 may include additional aspects, such as any single aspect or any combination of aspects described below and/or in connection with one or more other processes described elsewhere herein.

In a first aspect, process 800 includes receiving a configuration that configures a paging occasion for the UE in a first initial downlink bandwidth part.

In a second aspect, alone or in combination with the first aspect, at least one of an SSB or a TRS is not configured in a first initial downlink bandwidth part.

In a third aspect, alone or in combination with one or more of the first and second aspects, process 800 includes receiving the PEI in the second initial downlink bandwidth part based at least in part on monitoring for the PEI in the second initial downlink bandwidth part, and switching from the second initial downlink bandwidth part to a first initial downlink bandwidth part after receiving the PEI in the second initial downlink bandwidth part.

In a fourth aspect, alone or in combination with one or more of the first through third aspects, process 800 includes processing a paging occasion for the UE in the first initial downlink bandwidth part after switching from the second initial downlink bandwidth part to the first initial downlink bandwidth part.

In a fifth aspect, alone or in combination with one or more of the first through fourth aspects, a minimum amount of time between the PEI and a paging occasion for the UE corresponds to a bandwidth part switching delay supported by the UE.

In a sixth aspect, alone or in combination with one or more of the first through fifth aspects, a PDCCH based at least in part on which the UE monitors for the PEI is different from a PDCCH based at least in part on which UEs included in a second category of UEs monitor for PEIs.

In a seventh aspect, alone or in combination with one or more of the first through sixth aspects, at least one of a CORESET or a search space set based at least in part on which the UE monitors for the PEI is separately configured for monitoring for PEIs by UEs included in the first category of UEs.

In an eighth aspect, alone or in combination with one or more of the first through seventh aspects, a location at which the UE monitors for the PEI is different from a location at which UEs included in a second category of UEs monitor for PEIs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
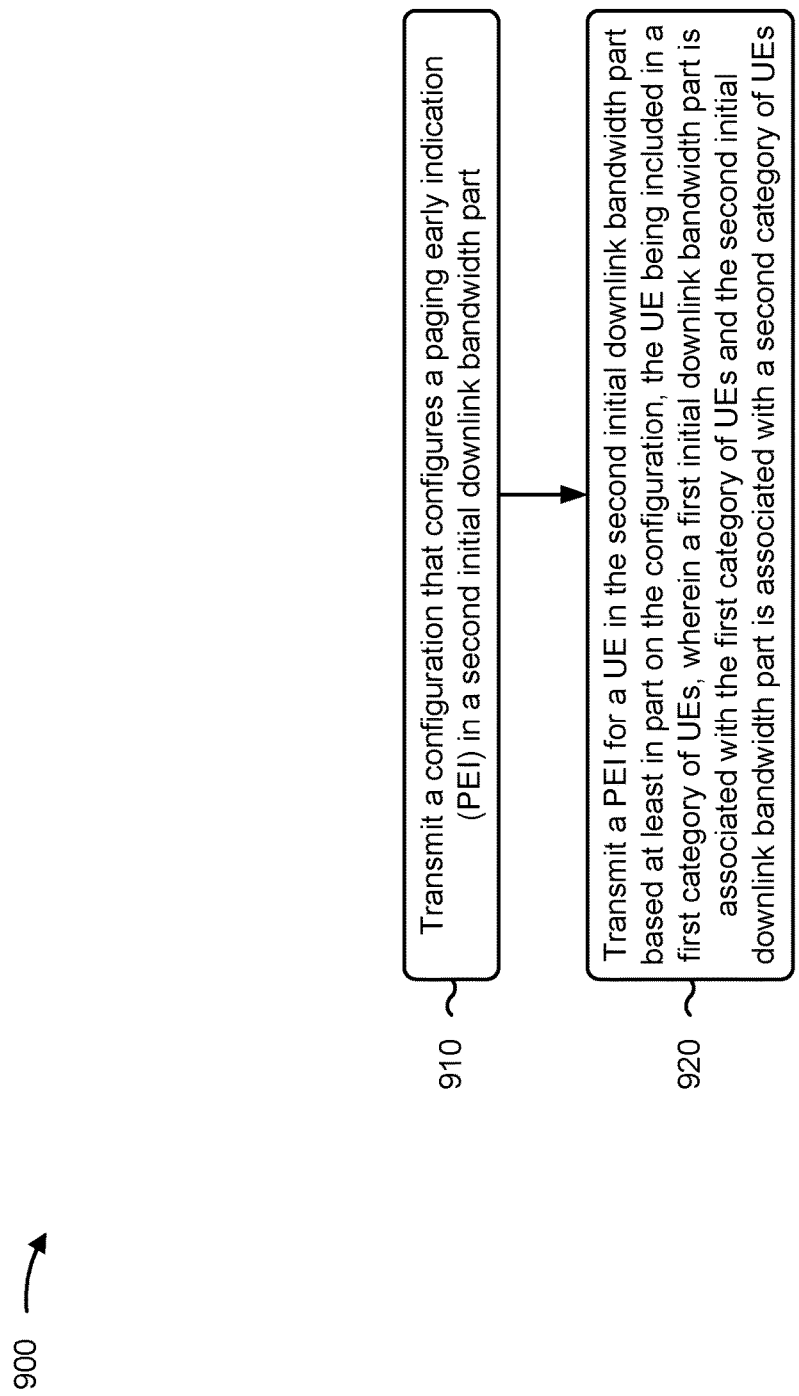

FIG. 9 is a diagram illustrating an example process 900 performed, for example, by a base station, in accordance with the present disclosure. Example process 900 is an example where the base station (e.g., base station 110) performs operations associated with PEI for a UE.

As shown in FIG. 9, in some aspects, process 900 may include transmitting a configuration that configures a PEI in a second initial downlink bandwidth part (block 910). For example, the base station (e.g., using communication manager 150 and/or transmission component 1104, depicted in FIG. 11) may transmit a configuration that configures a PEI in a second initial downlink bandwidth part, as described above.

As further shown in FIG. 9, in some aspects, process 900 may include transmitting a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs (block 920). For example, the base station (e.g., using communication manager 150 and/or transmission component 1104, depicted in FIG. 11) may transmit a PEI for a UE in the non-initial downlink bandwidth part based at least in part on the configuration, the UE being included in a first category of UEs, wherein a first initial downlink bandwidth part is associated with the first category of UEs and the second initial downlink bandwidth part is associated with a second category of UEs, as described above.

Process 900 may include additional aspects, such as any single aspect or any combination of aspects described below and/or in connection with one or more other processes described elsewhere herein.

In a first aspect, process 900 includes transmitting a configuration that configures a paging occasion for the UE in the first initial downlink bandwidth part.

In a second aspect, alone or in combination with the first aspect, at least one of an SSB or a TRS is not configured in the first initial downlink bandwidth part.

In a third aspect, alone or in combination with one or more of the first and second aspects, a minimum amount of time between the PEI and a paging occasion for the UE corresponds to a bandwidth part switching delay supported by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
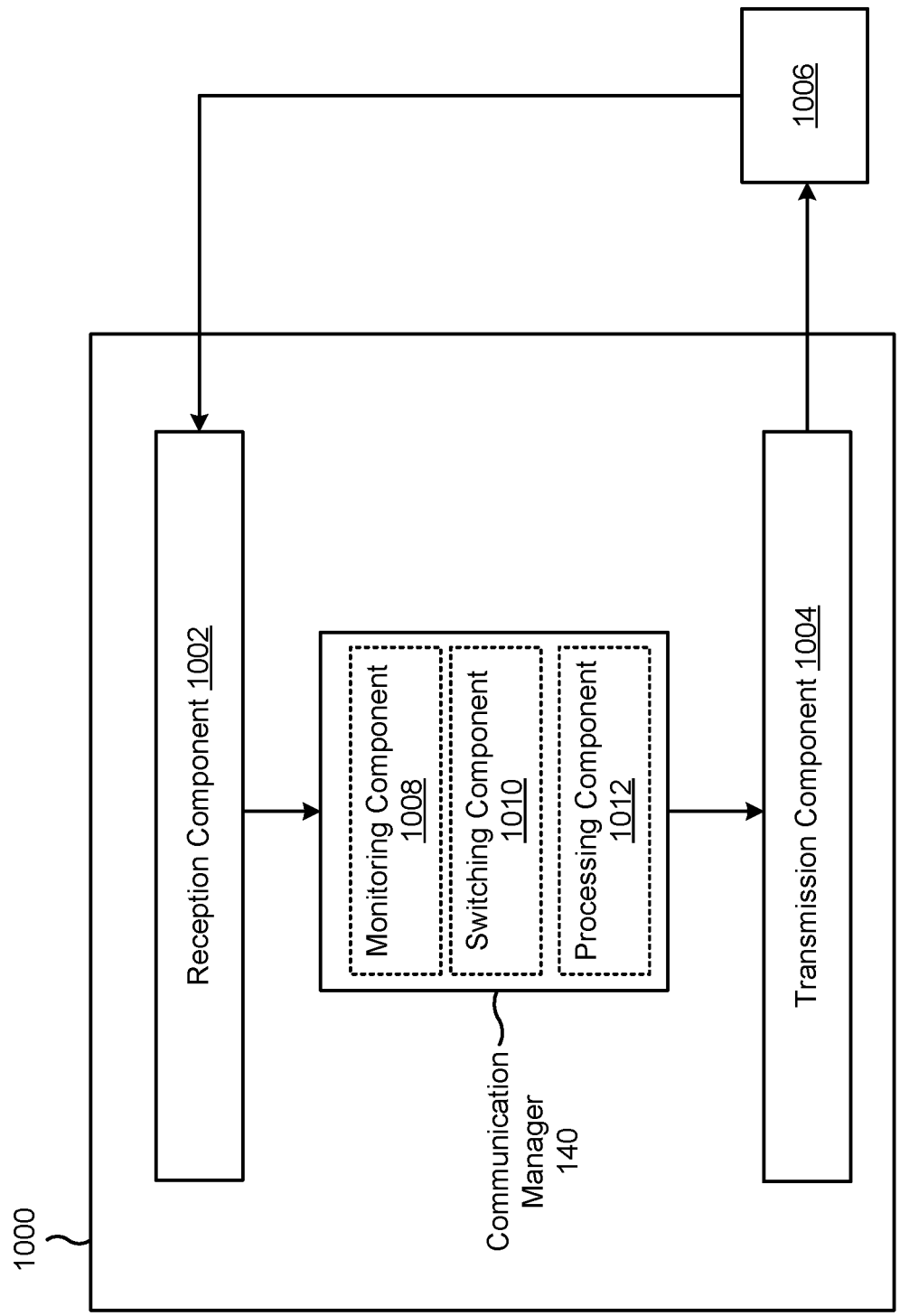
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a monitoring component 1008, a switching component 1010, or a processing component 1012, among other examples.

In some aspects, the apparatus 1000 may be configured to perform one or more operations described herein in connection with FIGS. 4 and 5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some aspects, the reception component 1002 may receive a configuration that configures a PEI in a first initial downlink bandwidth part, the UE being included in a first category of UEs and the first initial downlink bandwidth part being an initial downlink bandwidth part associated with the first category of UEs. In some aspects, the monitoring component 1008 may monitor for a PEI in the first initial downlink bandwidth part based at least in part on the configuration.

The reception component 1002 may receive the PEI in the first initial downlink bandwidth part based at least in part on monitoring for the PEI in the first initial downlink bandwidth part.

The switching component 1010 may switch from the first initial downlink bandwidth part to a second initial downlink bandwidth part after receiving the PEI in the first initial downlink bandwidth part.

The processing component 1012 may process a paging occasion for the UE in the second initial downlink bandwidth part after switching from the first initial downlink bandwidth part to the second initial downlink bandwidth part.

The reception component 1002 may receive an SSB or a TRS in the first initial downlink bandwidth part.

The reception component 1002 may receive an SSB or a TRS in a second initial downlink bandwidth part, wherein the SSB or the TRS is not received in the first initial downlink bandwidth part.

The reception component 1002 may receive a configuration that configures a paging occasion for the UE in the first initial downlink bandwidth part.

The reception component 1002 may receive the PEI in the first initial downlink bandwidth part based at least in part on monitoring for the PEI in the first initial downlink bandwidth part.

The processing component 1012 may process a paging occasion for the UE in the first initial downlink bandwidth part after receiving the PEI in the first initial downlink bandwidth part.

The processing component 1012 may refrain from decoding a PDCCH candidate, associated with the PEI or a paging PDCCH, that overlaps at least one of an NCD-SSB or a TRS in the first initial downlink bandwidth part.

The processing component 1012 may decode a PDCCH candidate, associated with the PEI or a paging PDCCH, that overlaps at least one of an NCD-SSB or a TRS in the first initial downlink bandwidth part.

The processing component 1012 may refrain from decoding a PDCCH candidate, associated with the PEI or a paging PDCCH, that overlaps a CD-SSB in the first initial downlink bandwidth part.

In some aspects, the reception component 1002 may receive a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs In some aspects, the monitoring component 1008 may monitor for a PEI in the second initial downlink bandwidth part based at least in part on the configuration.

The reception component 1002 may receive a configuration that configures a paging occasion for the UE in the first initial downlink bandwidth part.

The reception component 1002 may receive the PEI in the second initial downlink bandwidth part based at least in part on monitoring for the PEI in the second initial downlink bandwidth part.

The switching component 1010 may switch from the second initial downlink bandwidth part to the first initial downlink bandwidth part after receiving the PEI in the second initial downlink bandwidth part.

The processing component 1012 may process a paging occasion for the UE in the first initial downlink bandwidth part after switching from the second initial downlink bandwidth part to the first initial downlink bandwidth part.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
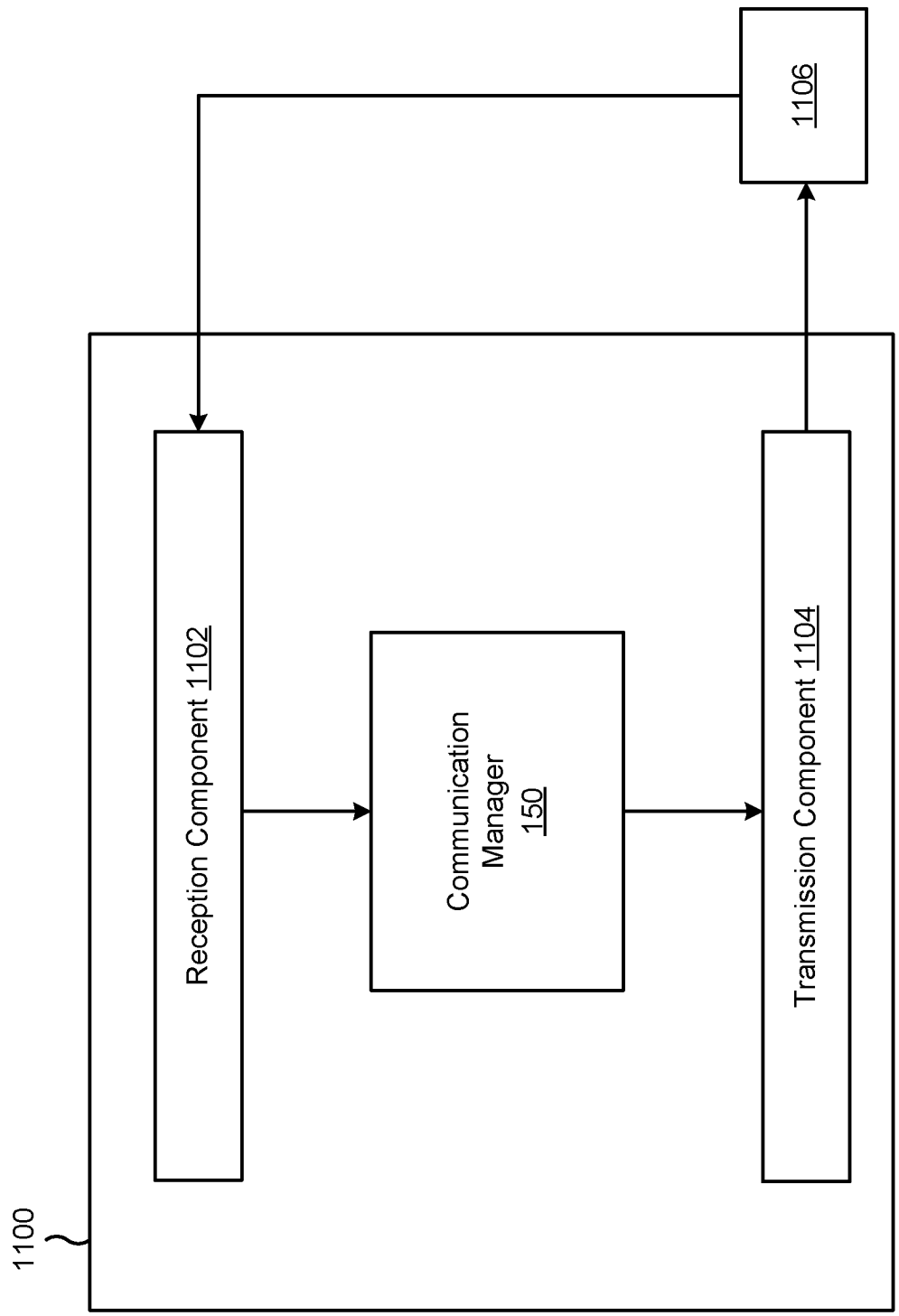

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150.

In some aspects, the apparatus 1100 may be configured to perform one or more operations described herein in connection with FIGS. 4 and 5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

In some aspects, the transmission component 1104 may transmit a configuration that configures a PEI in a first initial downlink bandwidth part. In some aspects, the transmission component 1104 may transmit a PEI for a UE in the first initial downlink bandwidth part based at least in part on the configuration, the UE being included in a first category of UEs and the first initial downlink bandwidth part being an initial downlink bandwidth part associated with the first category of UEs.

The transmission component 1104 may transmit an SSB or a TRS in the first initial downlink bandwidth part.

The transmission component 1104 may transmit an SSB or a TRS in a second initial downlink bandwidth part, wherein the SSB or the TRS is not transmitted in the first initial downlink bandwidth part.

The transmission component 1104 may transmit a configuration that configures a paging occasion for the UE in the first initial downlink bandwidth part.

In some aspects, the transmission component 1104 may transmit a configuration that configures a PEI in a second initial downlink bandwidth part. In some aspects, the transmission component 1104 may transmit a PEI for a UE in the second initial downlink bandwidth part based at least in part on the configuration, the UE being included in a first category of UEs and the first initial downlink bandwidth part being an initial downlink bandwidth part associated with the first category of UEs.

The transmission component 1104 may transmit a configuration that configures a paging occasion for the UE in the first initial downlink bandwidth part.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving a configuration that configures a PEI in a first initial downlink bandwidth part; and monitoring for a PEI in the first initial downlink bandwidth part based at least in part on the configuration.

Aspect 2: The method of Aspect 1, wherein a paging occasion for the UE is not configured in the first initial downlink bandwidth part.

Aspect 3: The method of any of Aspects 1-2, further comprising: receiving the PEI in the first initial downlink bandwidth part based at least in part on monitoring for the PEI in the first initial downlink bandwidth part; and switching from the first initial downlink bandwidth part to a second initial downlink bandwidth part after receiving the PEI in the first initial downlink bandwidth part.

Aspect 4: The method of Aspect 3, further comprising: processing a paging occasion for the UE in the second initial downlink bandwidth part after switching from the first initial downlink bandwidth part to the second initial downlink bandwidth part.

Aspect 5: The method of any of Aspects 1-4, wherein a minimum amount of time between the PEI and a paging occasion for the UE corresponds to a bandwidth part switching delay supported by the UE.

Aspect 6: The method of any of Aspects 1-5, further comprising receiving an SSB or a TRS in the first initial downlink bandwidth part.

Aspect 7: The method of any of Aspects 1-5, further comprising receiving an SSB or a TRS in a second initial downlink bandwidth part, wherein the SSB or the TRS is not received in the first initial downlink bandwidth part.

Aspect 8: The method of any of Aspects 1-7, further comprising receiving a configuration that configures a paging occasion for the UE in the first initial downlink bandwidth part.

Aspect 9: The method of Aspect 8, wherein the UE is to monitor for the PEI based at least in part on at least one of a CORESET or a search space set indicated in the configuration that configures the paging occasion for the UE in the first initial downlink bandwidth part.

Aspect 10: The method of any of Aspects 8-9, wherein the UE is to monitor for the PEI based at least in part on at least one of a CORESET or a search space set indicated in a configuration separate from the configuration that configures the paging occasion for the UE in the first initial downlink bandwidth part.

Aspect 11: The method of any of Aspects 1-10, further comprising: receiving the PEI in the first initial downlink bandwidth part based at least in part on monitoring for the PEI in the first initial downlink bandwidth part; and processing a paging occasion for the UE in the first initial downlink bandwidth part after receiving the PEI in the first initial downlink bandwidth part.

Aspect 12: The method of any of Aspects 1-11, wherein a search space set based at least in part on which the UE monitors for the PEI is a search space set based at least in part on which UEs included in a second category of UEs monitor for PEIs.

Aspect 13: The method of any of Aspects 1-11, wherein a search space set based at least in part on which the UE monitors for the PEI is configured separately from a search space set based at least in part on which UEs included in a second category of UEs monitor for PEIs.

Aspect 14: The method of Aspect any of Aspects 1-13, further comprising refraining from decoding a PDCCH candidate, associated with the PEI or a paging PDCCH, that overlaps at least one of an NCD-SSB or a TRS in the first initial downlink bandwidth part.

Aspect 15: The method of any of Aspects 1-13, further comprising decoding a PDCCH candidate, associated with the PEI or a paging PDCCH, that overlaps at least one of an NCD-SSB or a TRS in the first initial downlink bandwidth part.

Aspect 16: The method of any of Aspects 1-15, further comprising refraining from decoding a PDCCH candidate, associated with the PEI or a paging PDCCH, that overlaps a CD-SSB in the first initial downlink bandwidth part.

Aspect 17: The method of any of Aspects 1-16, wherein a quantity of resources in the first initial downlink bandwidth part indicated by a first signal configuration is less than a quantity of resources in the first initial downlink bandwidth part indicated by a second signal configuration, and a quantity of signals between the PEI and a paging occasion for the first signal configuration is not less than a quantity of signals between the PEI and the paging occasion for the second signal configuration.

Aspect 18: The method of any of Aspects 1-16, wherein a quantity of resources in the first initial downlink bandwidth part indicated by a first signal configuration is less than a quantity of resources in the first initial downlink bandwidth part indicated by a second signal configuration, and an amount of time between the PEI and a paging occasion for the first signal configuration is not less than an amount of time between the PEI and the paging occasion for the second signal configuration.

Aspect 19: A method of wireless communication performed by a base station, comprising: transmitting a configuration that configures a PEI in a first initial downlink bandwidth part; and transmitting a PEI for a UE in the first initial downlink bandwidth part based at least in part on the configuration, the UE being included in a first category of UEs and the first initial downlink bandwidth part being an initial downlink bandwidth part associated with the first category of UEs.

Aspect 20: The method of Aspect 19, wherein a paging occasion for the UE is not configured in the first initial downlink bandwidth part.

Aspect 21: The method of any of Aspects 19-20, wherein a minimum amount of time between the PEI and a paging occasion for the UE corresponds to a bandwidth part switching delay supported by the UE.

Aspect 22: The method of any of Aspects 19-21, further comprising transmitting an SSB or a TRS in the first initial downlink bandwidth part.

Aspect 23: The method of any of Aspects 19-22, further comprising transmitting an SSB or a TRS in a second initial downlink bandwidth part, wherein the SSB or the TRS is not transmitted in the first initial downlink bandwidth part.

Aspect 24: The method of any of Aspects 19-23, further comprising transmitting a configuration that configures a paging occasion for the UE in the first initial downlink bandwidth part.

Aspect 25: A method of wireless communication performed by a UE, comprising: receiving a configuration that configures a PEI in a second initial downlink bandwidth part, the UE being included in a first category of UEs, wherein a first initial downlink bandwidth part is associated with the first category of UEs and the second initial downlink bandwidth part is associated with a second category of UEs; and monitoring for a PEI in the second initial downlink bandwidth part based at least in part on the configuration.

Aspect 26: The method of Aspect 25, further comprising receiving a configuration that configures a paging occasion for the UE in the first initial downlink bandwidth part.

Aspect 27: The method of any of Aspects 25-26, wherein at least one of an SSB or a TRS is not configured in the first initial downlink bandwidth part.

Aspect 28: The method of any of Aspects 25-27, further comprising: receiving the PEI in the second initial downlink bandwidth part based at least in part on monitoring for the PEI in the second initial downlink bandwidth part; and switching from the second initial downlink bandwidth part to the first initial downlink bandwidth part after receiving the PEI in the second initial downlink bandwidth part.

Aspect 29: The method of Aspect 28, further comprising: processing a paging occasion for the UE in the first initial downlink bandwidth part after switching from the second initial downlink bandwidth part to the first initial downlink bandwidth part.

Aspect 30: The method of any of Aspects 25-29, wherein a minimum amount of time between the PEI and a paging occasion for the UE corresponds to a bandwidth part switching delay supported by the UE.

Aspect 31: The method of any of Aspects 25-30, wherein a PDCCH based at least in part on which the UE monitors for the PEI is different from a PDCCH based at least in part on which UEs included in the second category of UEs monitor for PEIs.

Aspect 32: The method of any of Aspects 25-31, wherein at least one of a CORESET or a search space set based at least in part on which the UE monitors for the PEI is separately configured for monitoring for PEIs by UEs included in the first category of UEs.

Aspect 33: The method of any of Aspects 25-32, wherein a location at which the UE monitors for the PEI is different from a location at which UEs included in the second category of UEs monitor for PEIs.

Aspect 34: A method of wireless communication performed by a base station, comprising: transmitting a configuration that configures a PEI in a second initial downlink bandwidth part; and transmitting a PEI for a UE in the second initial downlink bandwidth part based at least in part on the configuration, the UE being included in a first category of UEs, wherein a first initial downlink bandwidth part is associated with the first category of UEs and the second initial downlink bandwidth part is associated with a second category of UEs.

Aspect 35: The method of Aspect 34, further comprising transmitting a configuration that configures a paging occasion for the UE in the first initial downlink bandwidth part.

Aspect 36: The method of any of Aspects 34-35, wherein at least one of an SSB or a TRS is not configured in the first initial downlink bandwidth part.

Aspect 37: The method of any of Aspects 34-36, wherein a minimum amount of time between the PEI and a paging occasion for the UE corresponds to a bandwidth part switching delay supported by the UE.

Aspect 38: An apparatus for wireless communication at a device, comprising a processor; memory coupled with the processor; and instructions stored in the memory and executable by the processor to cause the apparatus to perform the method of one or more of Aspects 1-18.

Aspect 39: A device for wireless communication, comprising a memory and one or more processors coupled to the memory, the one or more processors configured to perform the method of one or more of Aspects 1-18.

Aspect 40: An apparatus for wireless communication, comprising at least one means for performing the method of one or more of Aspects 1-18.

Aspect 41: A non-transitory computer-readable medium storing code for wireless communication, the code comprising instructions executable by a processor to perform the method of one or more of Aspects 1-18.

Aspect 42: A non-transitory computer-readable medium storing a set of instructions for wireless communication, the set of instructions comprising one or more instructions that, when executed by one or more processors of a device, cause the device to perform the method of one or more of Aspects 1-18.

Aspect 43: An apparatus for wireless communication at a device, comprising a processor; memory coupled with the processor; and instructions stored in the memory and executable by the processor to cause the apparatus to perform the method of one or more of Aspects 19-24.

Aspect 44: A device for wireless communication, comprising a memory and one or more processors coupled to the memory, the one or more processors configured to perform the method of one or more of Aspects 19-24.

Aspect 45: An apparatus for wireless communication, comprising at least one means for performing the method of one or more of Aspects 19-24.

Aspect 46: A non-transitory computer-readable medium storing code for wireless communication, the code comprising instructions executable by a processor to perform the method of one or more of Aspects 19-24.

Aspect 47: A non-transitory computer-readable medium storing a set of instructions for wireless communication, the set of instructions comprising one or more instructions that, when executed by one or more processors of a device, cause the device to perform the method of one or more of Aspects 19-24.

Aspect 48: An apparatus for wireless communication at a device, comprising a processor; memory coupled with the processor; and instructions stored in the memory and executable by the processor to cause the apparatus to perform the method of one or more of Aspects 25-33.

Aspect 49: A device for wireless communication, comprising a memory and one or more processors coupled to the memory, the one or more processors configured to perform the method of one or more of Aspects 25-33.

Aspect 50: An apparatus for wireless communication, comprising at least one means for performing the method of one or more of Aspects 25-33.

Aspect 51: A non-transitory computer-readable medium storing code for wireless communication, the code comprising instructions executable by a processor to perform the method of one or more of Aspects 25-33.

Aspect 52: A non-transitory computer-readable medium storing a set of instructions for wireless communication, the set of instructions comprising one or more instructions that, when executed by one or more processors of a device, cause the device to perform the method of one or more of Aspects 25-33.

Aspect 53: An apparatus for wireless communication at a device, comprising a processor; memory coupled with the processor; and instructions stored in the memory and executable by the processor to cause the apparatus to perform the method of one or more of Aspects 34-37.

Aspect 54: A device for wireless communication, comprising a memory and one or more processors coupled to the memory, the one or more processors configured to perform the method of one or more of Aspects 34-37.

Aspect 55: An apparatus for wireless communication, comprising at least one means for performing the method of one or more of Aspects 34-37.

Aspect 56: A non-transitory computer-readable medium storing code for wireless communication, the code comprising instructions executable by a processor to perform the method of one or more of Aspects 34-37.

Aspect 57: A non-transitory computer-readable medium storing a set of instructions for wireless communication, the set of instructions comprising one or more instructions that, when executed by one or more processors of a device, cause the device to perform the method of one or more of Aspects 34-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a configuration that configures a paging early indication (PEI) in a first initial downlink bandwidth part, the UE being included in a first category of UEs and the first initial downlink bandwidth part being an initial downlink bandwidth part associated with the first category of UEs;
      monitor for a PEI in the first initial downlink bandwidth part based at least in part on the configuration; and
      wherein a search space set based at least in part on which the UE monitors for the PEI is configured separately from a search space set based at least in part on which UEs included in a second category of UEs monitor for PEIs.

2. The UE of claim 1, wherein a paging occasion for the UE is not configured in the first initial downlink bandwidth part.

3. The UE of claim 1, wherein the one or more processors are further configured to:
   receive the PEI in the first initial downlink bandwidth part based at least in part on monitoring for the PEI in the first initial downlink bandwidth part; and
   switch from the first initial downlink bandwidth part to a second initial downlink bandwidth part after receiving the PEI in the first initial downlink bandwidth part.

4. The UE of claim 3, wherein the one or more processors are further configured to:
   process a paging occasion for the UE in the second initial downlink bandwidth part after switching from the first initial downlink bandwidth part to the second initial downlink bandwidth part.

5. The UE of claim 1, wherein a minimum amount of time between the PEI and a paging occasion for the UE corresponds to a bandwidth part switching delay supported by the UE.

6. The UE of claim 1, wherein the one or more processors are further configured to receive a synchronization signal block (SSB) or a tracking reference signal (TRS) in the first initial downlink bandwidth part.

7. The UE of claim 1, wherein the one or more processors are further configured to receive a synchronization signal block (SSB) or a tracking reference signal (TRS) in a second initial downlink bandwidth part, wherein the SSB or the TRS is not received in the first initial downlink bandwidth part.

8. The UE of claim 1, wherein the one or more processors are further configured to receive a configuration that configures a paging occasion for the UE in the first initial downlink bandwidth part.

9. The UE of claim 8, wherein the UE is to monitor for the PEI based at least in part on at least one of a control resource set (CORESET) or a search space set indicated in the configuration that configures the paging occasion for the UE in the first initial downlink bandwidth part.

10. The UE of claim 8, wherein the UE is to monitor for the PEI based at least in part on at least one of a control resource set (CORESET) or a search space set indicated in a configuration separate from the configuration that configures the paging occasion for the UE in the first initial downlink bandwidth part.

11. The UE of claim 1, wherein the one or more processors are further configured to:
receive the PEI in the first initial downlink bandwidth part based at least in part on monitoring for the PEI in the first initial downlink bandwidth part; and
process a paging occasion for the UE in the first initial downlink bandwidth part after receiving the PEI in the first initial downlink bandwidth part.

12. The UE of claim 1, wherein the one or more processors are further configured to refrain from decoding a physical downlink control channel (PDCCH) candidate, associated with the PEI or a paging PDCCH, that overlaps at least one of a non-cell-defining synchronization signal block (NCD-SSB) or a tracking reference signal (TRS) in the first initial downlink bandwidth part.

13. The UE of claim 1, wherein the one or more processors are further configured to decode a physical downlink control channel (PDCCH) candidate, associated with the PEI or a paging PDCCH, that overlaps at least one of a non-cell-defining synchronization signal block (NCD-SSB) or a tracking reference signal (TRS) in the first initial downlink bandwidth part.

14. The UE of claim 1, wherein the one or more processors are further configured to refrain from decoding a physical downlink control channel (PDCCH) candidate, associated with the PEI or a paging PDCCH, that overlaps a cell-defining synchronization signal block (CD-SSB) in the first initial downlink bandwidth part.

15. A user equipment (UE) for wireless communication, comprising:
a memory; and
one or more processors, coupled to the memory, configured to:
receive a configuration that configures a paging early indication (PEI) in a first initial downlink bandwidth part, the UE being included in a first category of UEs and the first initial downlink bandwidth part being an initial downlink bandwidth part associated with the first category of UEs;
monitor for a PEI in the first initial downlink bandwidth part based at least in part on the configuration; and
wherein a search space set based at least in part on which the UE monitors for the PEI is a search space set based at least in part on which UEs included in a second category of UEs monitor for PEIs.

16. A user equipment (UE) for wireless communication, comprising:
a memory; and
one or more processors, coupled to the memory, configured to:
receive a configuration that configures a paging early indication (PEI) in a second initial downlink bandwidth part, the UE being included in a first category of UEs,
wherein a first initial downlink bandwidth part is associated with the first category of UEs and the second initial downlink bandwidth part is associated with a second category of UEs;
monitor for a PEI in the second initial downlink bandwidth part based at least in part on the configuration; and
wherein a search space set based at least in part on which the UE monitors for the PEI is configured separately from a search space set based at least in part on which UEs included in the second category of UEs monitor for PEIs.

17. The UE of claim 16, wherein the one or more processors are further configured to receive a configuration that configures a paging occasion for the UE in the first initial downlink bandwidth part.

18. The UE of claim 16, wherein at least one of a synchronization signal block (SSB) or a tracking reference signal (TRS) is not configured in the first initial downlink bandwidth part.

19. The UE of claim 16, wherein the one or more processors are further configured to:
receive the PEI in the second initial downlink bandwidth part based at least in part on monitoring for the PEI in the second initial downlink bandwidth part; and
switch from the second initial downlink bandwidth part to the first initial downlink bandwidth part after receiving the PEI in the second initial downlink bandwidth part.

20. The UE of claim 19, wherein the one or more processors are further configured to:
process a paging occasion for the UE in the first initial downlink bandwidth part after switching from the second initial downlink bandwidth part to the first initial downlink bandwidth part.

21. The UE of claim 16, wherein a minimum amount of time between the PEI and a paging occasion for the UE corresponds to a bandwidth part switching delay supported by the UE.

22. The UE of claim 16, wherein a physical downlink control channel (PDCCH) based at least in part on which the UE monitors for the PEI is different from a PDCCH based at least in part on which UEs included in the second category of UEs monitor for PEIs.

23. The UE of claim 16, wherein at least one of a control resource set (CORESET) or a search space set based at least in part on which the UE monitors for the PEI is separately configured for monitoring for PEIs by UEs included in the first category of UEs.

24. The UE of claim 16, wherein a location at which the UE monitors for the PEI is different from a location at which UEs included in the second category of UEs monitor for PEIs.

25. A user equipment (UE) for wireless communication, comprising:
a memory; and
one or more processors, coupled to the memory, configured to:
receive a configuration that configures a paging early indication (PEI) in a first initial downlink bandwidth part, the UE being included in a first category of UEs and the first initial downlink bandwidth part being an initial downlink bandwidth part associated with the first category of UEs;

monitor for a PEI in the first initial downlink bandwidth part based at least in part on the configuration; and
wherein the one or more processors are further configured to decode a physical downlink control channel (PDCCH) candidate, associated with the PEI or a paging PDCCH, that overlaps at least one of a non-cell-defining synchronization signal block (NCD-SSB) or a tracking reference signal (TRS) in the first initial downlink bandwidth part.

* * * * *